United States Patent
Allut

(10) Patent No.: US 10,914,267 B2
(45) Date of Patent: Feb. 9, 2021

(54) THRUST REVERSER SYSTEM FOR A TURBOJET ENGINE

(71) Applicant: SAFRAN AIRCRAFT ENGINES, Paris (FR)

(72) Inventor: Gabriel Allut, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 317 days.

(21) Appl. No.: 15/953,604

(22) Filed: Apr. 16, 2018

(65) Prior Publication Data

US 2018/0298844 A1 Oct. 18, 2018

(30) Foreign Application Priority Data

Apr. 14, 2017 (FR) ...................... 17 53283

(51) Int. Cl.
*F02K 1/76* (2006.01)
*F02K 1/72* (2006.01)

(52) U.S. Cl.
CPC ............. *F02K 1/766* (2013.01); *F02K 1/72* (2013.01); *F05D 2220/323* (2013.01); *F05D 2240/128* (2013.01); *F05D 2260/36* (2013.01); *F05D 2260/52* (2013.01); *Y02T 50/60* (2013.01)

(58) Field of Classification Search
CPC . F02K 1/766; F02K 1/72; F02K 1/625; F05D 2260/52
See application file for complete search history.

(56) References Cited

U.S. PATENT DOCUMENTS

| | | | | |
|---|---|---|---|---|
| 5,524,431 A * | 6/1996 | Brusson | ............... | F02K 1/76 239/265.31 |
| 2002/0145078 A1* | 10/2002 | Rouyer | ............... | F02K 1/766 244/110 B |
| 2010/0058736 A1* | 3/2010 | Lenk | ............... | F02K 1/766 60/226.2 |
| 2013/0228635 A1* | 9/2013 | Caruel | ............... | F02K 1/09 239/11 |
| 2014/0245716 A1* | 9/2014 | Gonidec | ............... | F02K 1/70 60/226.2 |
| 2016/0208740 A1* | 7/2016 | Hue | ............... | B64D 33/04 |

FOREIGN PATENT DOCUMENTS

| | | |
|---|---|---|
| EP | 0763654 | 3/1997 |
| FR | 2970521 | 7/2012 |

* cited by examiner

*Primary Examiner* — Andrew H Nguyen
(74) *Attorney, Agent, or Firm* — Burris Law, PLLC

(57) ABSTRACT

The present disclosure concerns a thrust reverser system for a turbojet engine and a method for unlocking a thrust reverser system. The thrust reverser system includes a movable cowl mounted on a nacelle of the turbojet engine that is displaceable between a closed position in which the thrust reverser system is inactivated and an open position in which the thrust reverser system is activated. The thrust reverser system includes a locking system having a first and second locking element mounted on the movable cowl and a fixed structure. The first and second locking elements lock and unlock relative to each other to lock the movable cowl on the fixed structure in the closed position. The locking system is shaped so that a controlled displacement of the movable cowl from its closed position to a reclosed position triggers unlocking of the first and second locking elements.

14 Claims, 16 Drawing Sheets

THRUST REVERSER SYSTEM FOR A TURBOJET ENGINE

CROSS-REFERENCE TO RELATED APPLICATIONS

This application claims priority to and the benefit of FR 17/53283 filed on Apr. 14, 2017. The disclosure of the above application is incorporated herein by reference.

FIELD

The present disclosure relates to a thrust reverser system for an aircraft turbojet engine and to a method for unlocking such a thrust reverser system.

BACKGROUND

The statements in this section merely provide background information related to the present disclosure and may not constitute prior art.

An aircraft comprises several turbojet engines each housed in a nacelle. A nacelle presents generally a tubular structure comprising an air inlet upstream of the turbojet engine, a median section intended to surround a fan of the turbojet engine, a downstream section possibly integrating thrust reversal means and intended to surround the combustion chamber of the turbojet engine, and is generally terminated by an ejection nozzle whose outlet is located downstream of the turbojet engine.

Modern nacelles are intended to accommodate a bypass turbojet engine capable of generating, on the one hand, a hot air flow (also called primary flow) originating from the combustion chamber of the turbojet engine and, on the other hand, a cold air flow (secondary flow) originating from the fan and circulating outside the turbojet engine through an annular passage, also called flow path, formed between an inner structure defining a fairing of the turbojet engine and an inner wall of the nacelle.

The two air flows are ejected from the turbojet engine from the rear of the nacelle. The role of a thrust reverser, during the landing of an aircraft, is to improve the braking capacity of the latter by redirecting forward at least part of the thrust generated by the turbojet engine.

In this phase, the thrust reverser obstructs the flow path of the (primary and/or secondary) flow and directs the latter to the front of the nacelle, thereby generating a counter-thrust which is added to the braking of the wheels of the aircraft and possibly of the air brakes on the wings.

The means implemented to carry out this reorientation of the flow vary depending on the thrust reverser type. However, in all cases, the structure of a thrust reverser comprises movable cowls displaceable between, on the one hand, a deployed position in which they allow the nacelle to divert forward at least the secondary air flow and, on the other hand, a stowed position in which they participate in the aerodynamics of the nacelle and the thrust reverser generates no counter-thrust.

These cowls may fulfill a diverting function or simply a function of activating other diverting means. In the case of a cascade-type thrust reverser, the reorientation of the air flow is performed by cascade vanes, the cowls having only but a simple sliding function aiming at uncovering or covering these cascades.

Complementary blocking doors, also called flaps, activated by the sliding of the cowling, generally enable a closure of the flow path downstream of the cascades so as to optimize the reorientation of the cold air flow.

In the case of a door-type thrust reverser, as described in the application EP0763654, two doors pivot about two distinct axes between a stowed position and a deployed position. When the doors are deployed, they divert both the secondary flow and the primary flow generally forward and outside of the nacelle.

During maintenance operations on a turbojet engine and the nacelle surrounding it, it is important to ensure that the movable cowls cannot open unexpectedly, which would represent a danger to the operators.

Similarly, when the internal safeties of the thrust reverser are damaged, which safeties are known as primary locks (PLS: Primary Lock System) and tertiary locks (TLS: Tertiary Lock System), it may be preferable to mechanically inhibit the movable cowls rather than risking a deployment in flight, which would be catastrophic. The inhibition of the movable the thrust reverser cowls during maintenance operations may be achieved by electrical and/or mechanical inhibition systems. An inhibition of the thrust reverser in flight will be done rather mechanically.

Such a mechanical inhibition is generally performed by screwing the movable cowls to a fixed structure of the nacelle, and/or via locking devices as described in FR2970521.

This locking device comprises one single tertiary lock disposed on a reactor mast intended to lock the latter on a movable cowl. This tertiary lock comprises a hook pivotally mounted about an axis, a blocking latch for blocking the hook, detection means, such as a magnetic or optical detector, allowing to detect the presence of the head of the latch, a connecting rod for detecting the correct closure of the cowl and an actuator for making the latch switch from its blocking position toward its unblocking position.

However, when the hook is in the locked position, it is not possible to reclose the thrust reverser without the risk of damaging the nacelle and the thrust reverser itself, which might happen in a maintenance situation.

In addition, this locking device requires several elements including a power supply, an electric actuator to actuate the hook and a detector, among others, resulting in a significant additional weight.

The device is also complex since it is necessary to provide for electrical wiring to power the actuators and the detectors.

SUMMARY

The present disclosure provides a thrust reverser system for a turbojet engine comprising a lighter and more robust locking system during the reclosure of the movable cowl when the locking system is locked.

The present disclosure concerns a thrust reverser system for a turbojet engine including at least one movable cowl mounted on a nacelle of the turbojet engine and displaceable between a closed position in which the thrust reverser system is inactivated and an open position in which the thrust reverser system is activated. The thrust reverser system further comprises at least one locking system provided with a first locking element and with a second locking element mounted respectively on the movable cowl and on a fixed structure of the nacelle, capable of being locked and unlocked relative to each other in order to lock the movable cowl on the fixed structure in the closed position of the movable cowl.

According to the present disclosure, the locking system is shaped so that a controlled displacement of the movable cowl from its closed position to a reclosed position triggers the unlocking of the first and second locking elements.

According to one variation, the first locking element comprises a first hinge having an axis of rotation B which, in the closed position of the movable cowl, is perpendicular to a direction X of displacement of the movable cowl between the closed position and the reclosed position of the latter, enabling a rotation of the first locking element between a locking position and an unlocking position relative to the second locking element.

Alternatively, the first locking element comprises a return spring capable of exerting a return force to return the first locking element to the second locking element.

According to another variant, the first and second locking elements respectively comprise a first and a second hooking member adapted to be hooked to each other in the locked position of the first and second locking elements, so as to inhibit the latter from being spaced apart from each other according to an opening direction of the movable cowl. The locking system comprises a path diverting device adapted so that the path followed by the first hooking member relative to the second hooking member takes on a different pathway between a reclosure phase when the movable cowl is displaced from its closed position toward its reclosed position and an opening phase when the movable cowl is displaced from its reclosed position toward its open position.

According to a first form, the path diverting device comprises an inclined wall formed on the second locking element and inclined with respect to a longitudinal axis E. A second hinge is provided on the second locking element. The second hinge has an axis C perpendicular to the axis of rotation B of the first locking element, enabling the rotation of the second locking element relative to the first locking element between a locking position in which the two locking elements are substantially aligned according to the direction X and an unlocking position in which the second locking element is inclined relative to the first locking element. The front end of the first locking element is intended to slip along the inclined wall and to push the latter in order to make it pivot from the locking position toward the unlocking position.

Alternatively, the path diverting device comprises a return spring tending to hold the second locking element in the locking position.

According to a second form, the path diverting device comprises an inclined wall formed on the second locking element. The second locking element is fastened on the fixed cowl and the first locking element is mounted on the movable cowl and comprises the first hinge making it movable in rotation relative to the latter about the axis B, when the movable cowl is displaced from the closed position to the reclosed position. The front end of the first locking element is intended to slip along the inclined wall causing a translation of the first hooking member of the first locking element.

Alternatively, the path diverting device comprises at least one cam pivotally mounted on a support secured to the fixed structure or to the movable cowl on which is mounted the second locking element, and a guide member provided at the front end of the first locking element. The guide member is adapted so that its displacement during the reclosure phase of the movable cowl enables the cam to pivot toward a rest position. The cam is adapted so that, during the opening phase of the movable cowl, the guide member cooperates with the cam held in its rest position so as to guide the first hooking member according to the different pathway.

Alternatively, the diverting device comprises a return spring allowing to bias in rotation the cam toward its rest position.

According to another variant, the cam has an internal face facing the second hooking member and an external face directed opposite to the second hooking member. The guide member is adapted to be displaced bearing against the internal face during the reclosure phase of the movable cowl and bearing against the external face during the opening phase of the movable cowl.

Advantageously, the axis D of the cam is positioned above the second hooking member of the second locking element so that the internal face of the cam is in contact with the guide member of the first locking element when the movable cowl is in the closed position.

Alternatively, the locking system comprises a safety device for inhibiting the rotation of the cam in case of uncontrolled reclosure of the movable cowl.

In one form, the safety device comprises a cylinder positioned in the proximity of the cam. The cylinder comprises a rod movable between a deployed position in which the rod is extended from the cylinder to bear on an upper face of a second portion in order to block the cam in case of reclosure of the movable cowl and a retracted position in which the rod is retracted into the cylinder to release the second portion of the cam.

The present disclosure also concerns a method for unlocking a thrust reverser system for a turbojet engine including at least one movable cowl mounted on a nacelle of the turbojet engine and displaceable between a closed position in which the thrust reverser system is inactivated and an open position in which the thrust reverser system is activated. The thrust reverser system further comprises at least one locking system, as previously defined. The locking system is provided with a first locking element and with a second locking element mounted respectively on the movable cowl and on a fixed structure of the nacelle, capable of being locked and unlocked relative to each other in order to lock the movable cowl on the fixed structure in the closed position of the movable cowl.

According to the present disclosure, a controlled displacement of the movable cowl from its closed position to a reclosed position triggers the unlocking of the first and second locking elements.

According to one form, the first and second locking elements respectively comprise a first and a second hooking member hooked to each other in the locked position of the first and second locking elements so as to inhibit the latter from being spaced apart from each other according to an opening direction of the movable cowl. The path followed by the first hooking member relative to the second hooking member takes on a different pathway between a reclosure phase when the movable cowl is displaced from its closed position toward its reclosed position and an opening phase when the movable cowl is displaced from its reclosed position toward its open position.

Alternatively, when the movable cowl is in the closed position, the rotation of the cam is inhibited by a safety device in the case of uncontrolled reclosure of the movable cowl.

Thus, the present disclosure provides a thrust reverser system for an aircraft turbojet engine comprising a lighter locking system.

Indeed, the use of locking systems of the related art involves the presence of three electric actuators, detectors and three power lines which cross the fuselage and the wings.

The present disclosure therefore allows removing these heavy elements and achieving a weight savings.

A nacelle with a simpler design is also obtained having less electrical cables and elements.

The present disclosure also provides a locking system more robust to the reclosure of the movable cowl when the locking system is locked.

Indeed, the arrangement of the hooking members and their shape allows reducing the risk of destructive collision between the elements of the lock during a bad maintenance manipulation, for example, whereas with a conventional lock, there is a risk of collision between the locking pin fastened to the movable cowl of the thrust reverser and the hook fastened to the mast.

The tertiary lock proposed herein may be fully autonomous. It then allows getting rid of the electric or hydraulic power supplies used for the actuation of the conventional locks. The locking and the unlocking of the nacelle are made respectively thanks to the closure ("stow") and reclosure ("over-stow") movements of the movable cowl of the nacelle.

The reclosure movement of the movable cowl is made before the deployment of the movable cowl, in particular to enable the subsequent unlocking of the hooking members.

In the case of the present disclosure, the reclosure movement of the movable cowl is simultaneously accompanied by the unlocking of the hooking members.

More specifically, it is the reclosure movement of the movable cowl which actuates the unlocking of the hooking members.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 17:
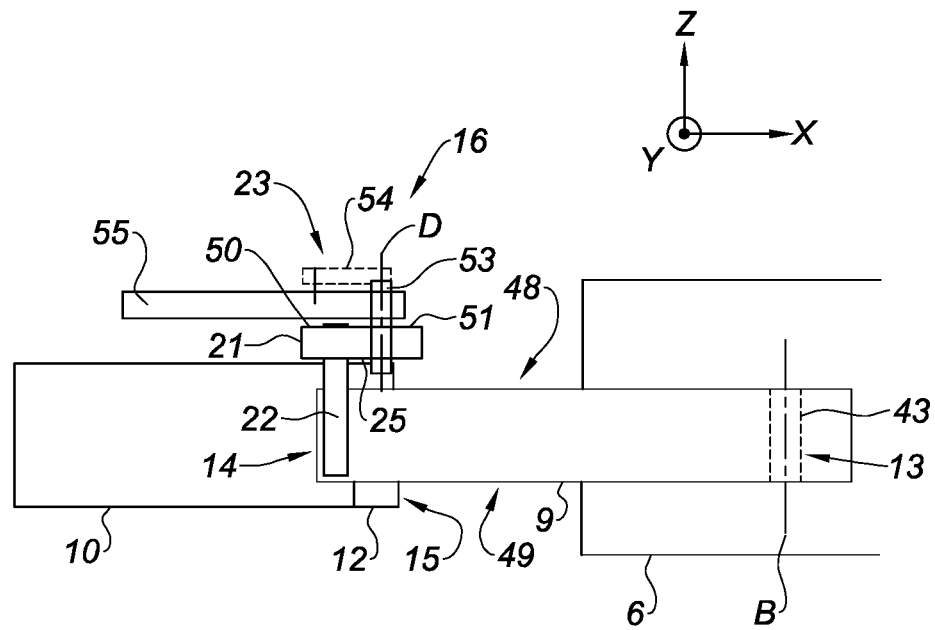
FIG. 17 is a schematic top view of a simplified variant of a locking system when a movable cowl is in a closed position according to the present disclosure.
Figure 19:
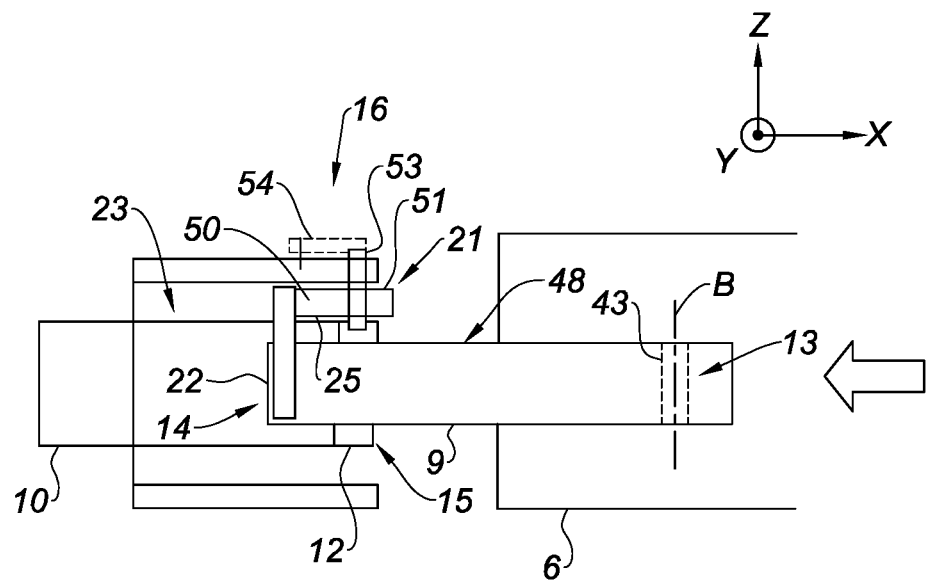
Figure 20:
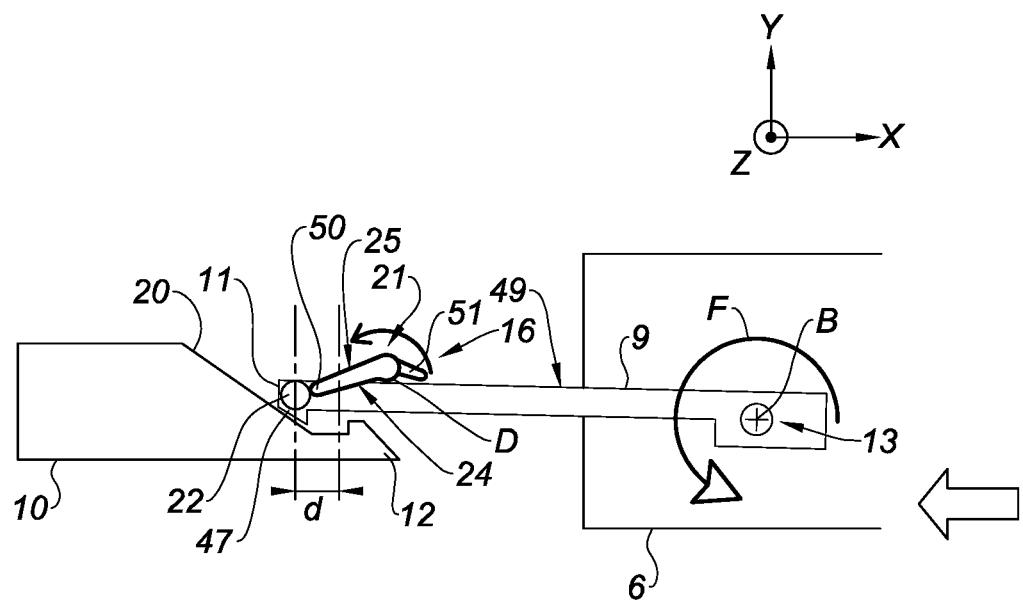
Figure 21:
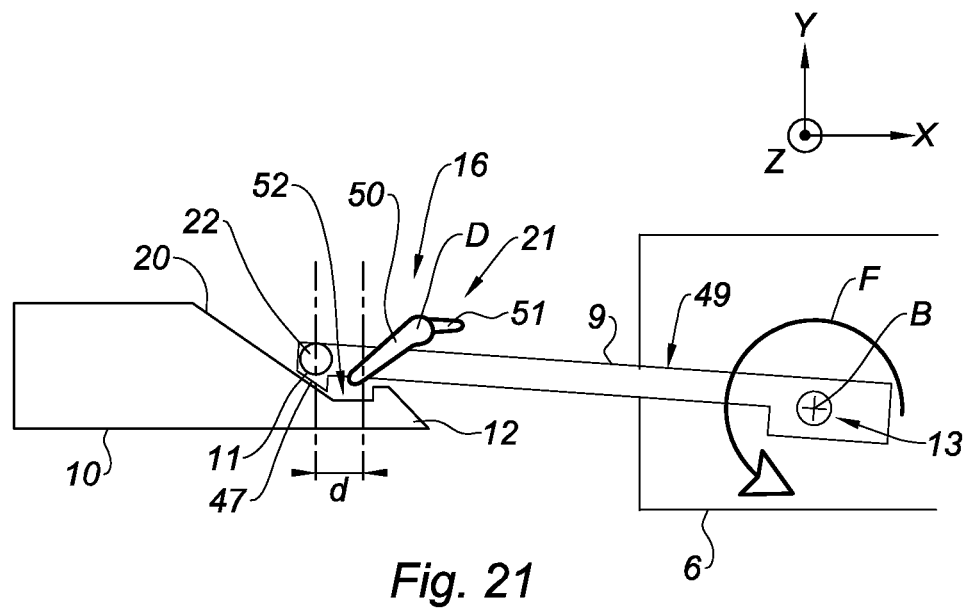
Figure 22:
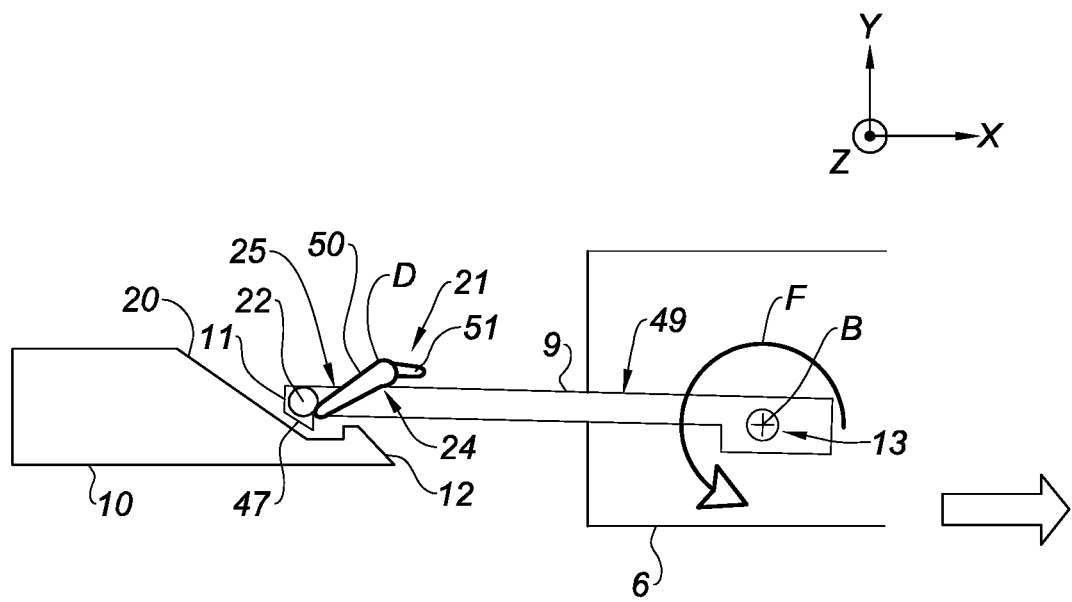
Figure 23:
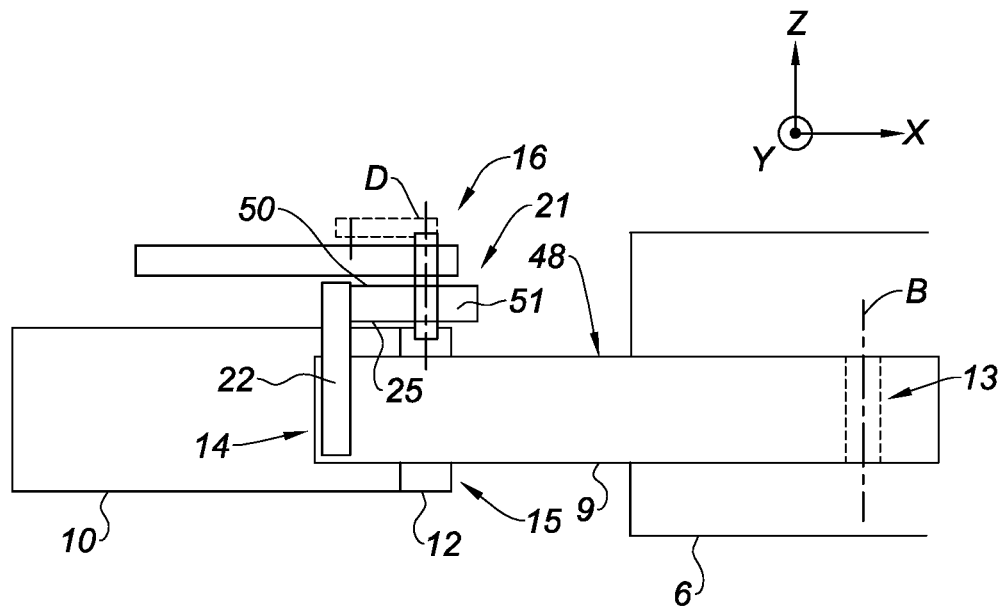
Figure 24:
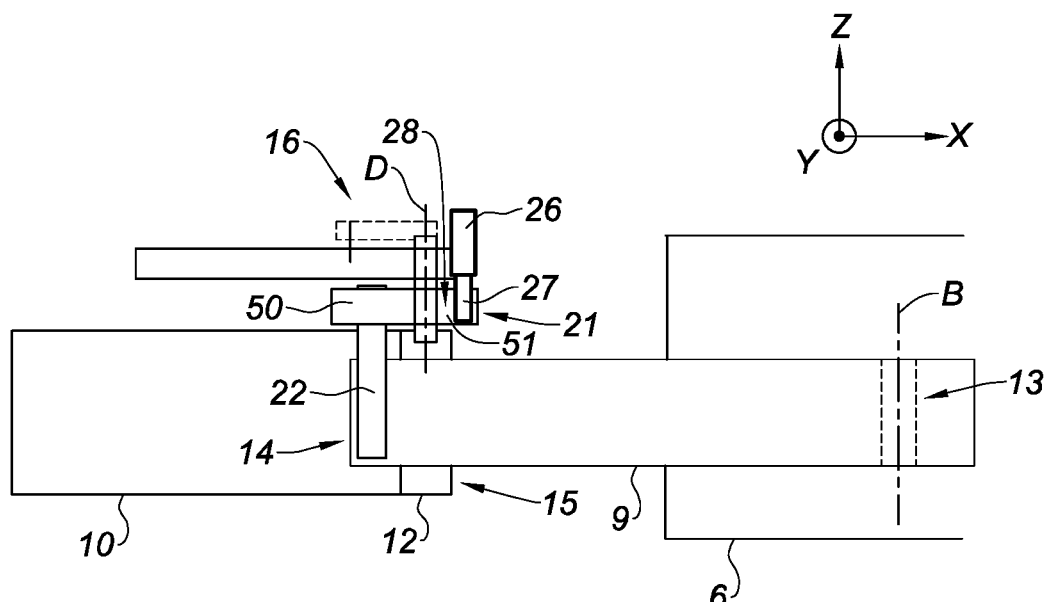
Figure 25:
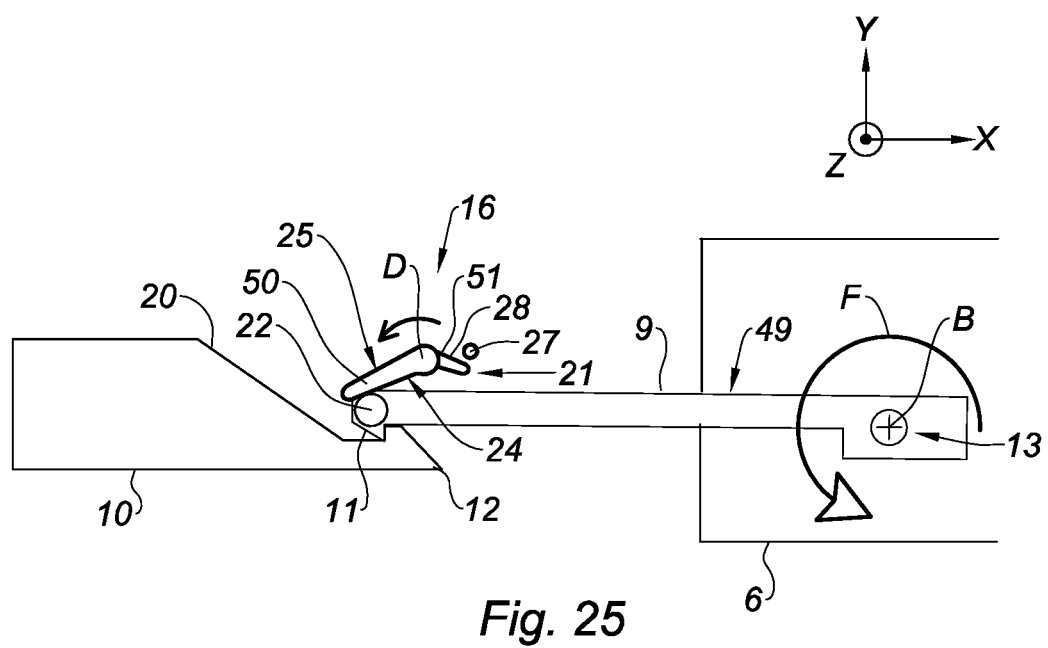
Figure 26:
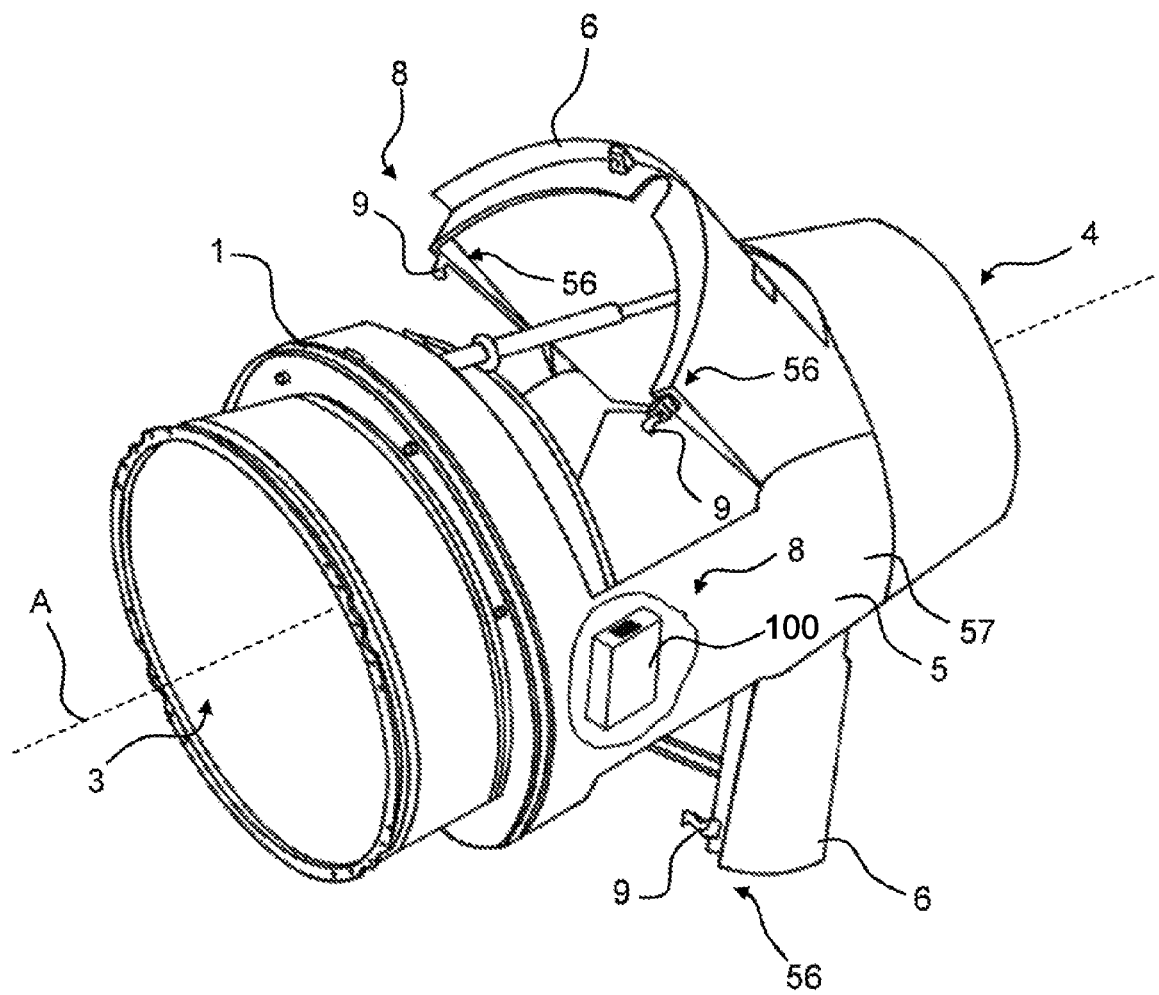
Figure 27:
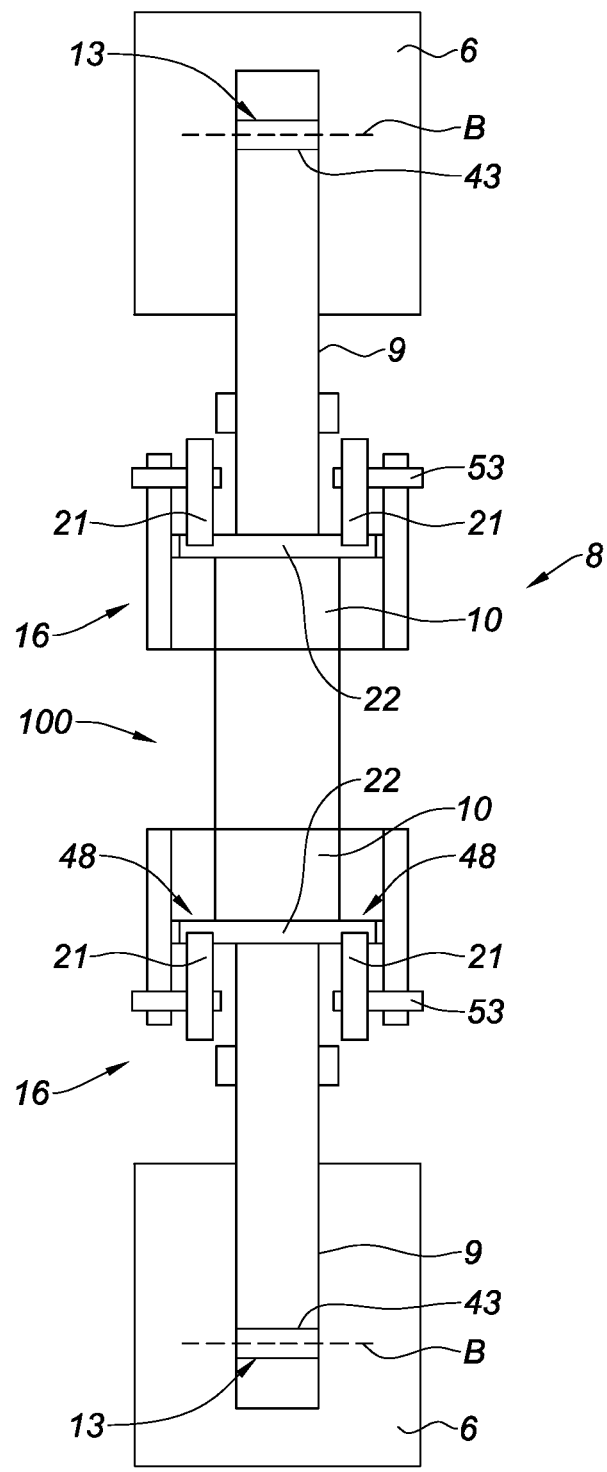
Figure 28:
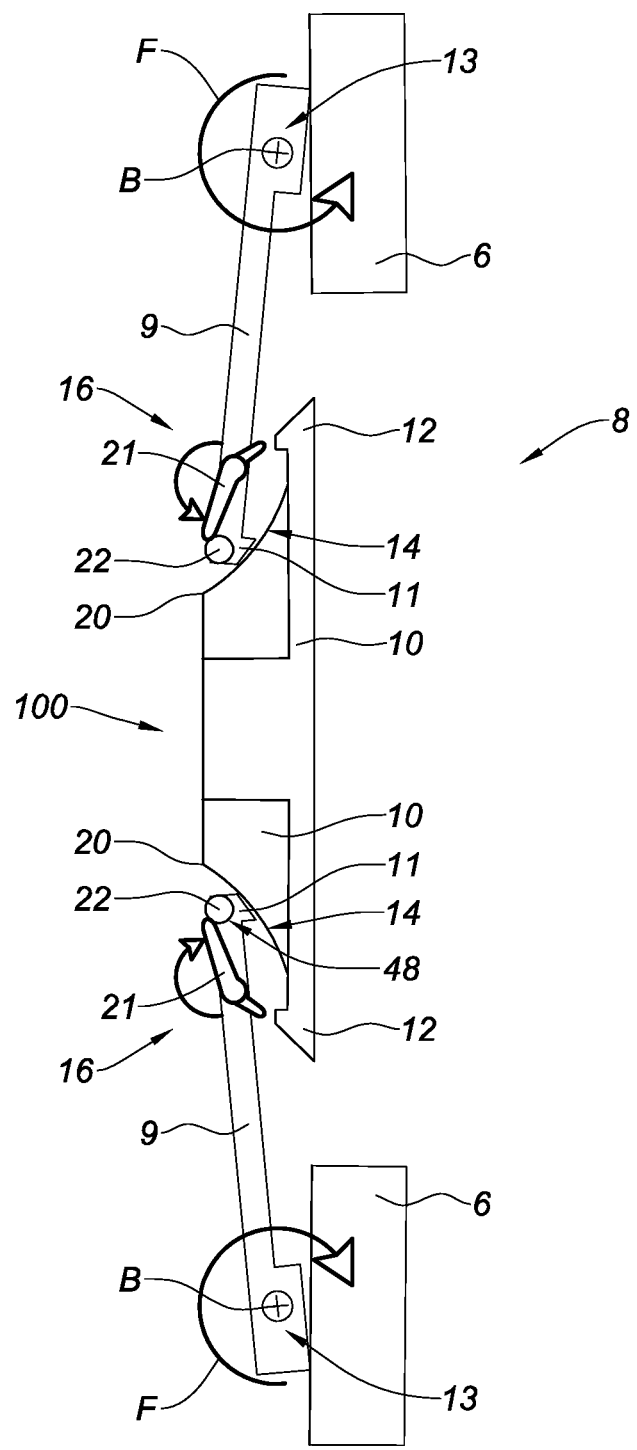

FIG. 19, a schematic top view of the locking system of FIG. 17 when the movable cowl starts translating toward a reclosed position;

FIG. 20, a schematic side view of the locking system of FIG. 17 when the movable cowl starts translating toward a reclosed position;

FIG. 21 is a schematic side view of a locking system when a movable cowl is in a reclosed position according to the present disclosure;

FIG. 22 is a schematic side view of a locking system when a movable cowl starts returning to an open position according to the present disclosure;

FIG. 23 is a schematic top view of a locking system when a movable cowl starts returning to an open position according to the present disclosure;

FIG. 24 is a schematic top view of a locking system comprising a cylinder in a blocking position of a cam when a movable cowl is in a closed position according to another form of the present disclosure;

FIG. 25 is a schematic side view of a locking system comprising a cylinder in a blocking position of a cam when a movable cowl is in a closed position according to the present disclosure;

FIG. 26 is a schematic view of a door-type thrust reverser system according to the present disclosure;

FIG. 27 is a schematic top view of a locking system of a door-type thrust reverser system according to the present disclosure; and FIG. 28 is a profile view of a locking system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, the longitudinal direction X shall be construed to mean a direction which is parallel to a longitudinal axis A of a nacelle 1 and to a longitudinal axis E of a locking system 8.

Furthermore, the terms front (or upstream) and rear (or downstream) are to be considered relative to a direction of advance of the aircraft encountered as a result of the thrust exerted by the turbojet engine 2.

Figure 1:
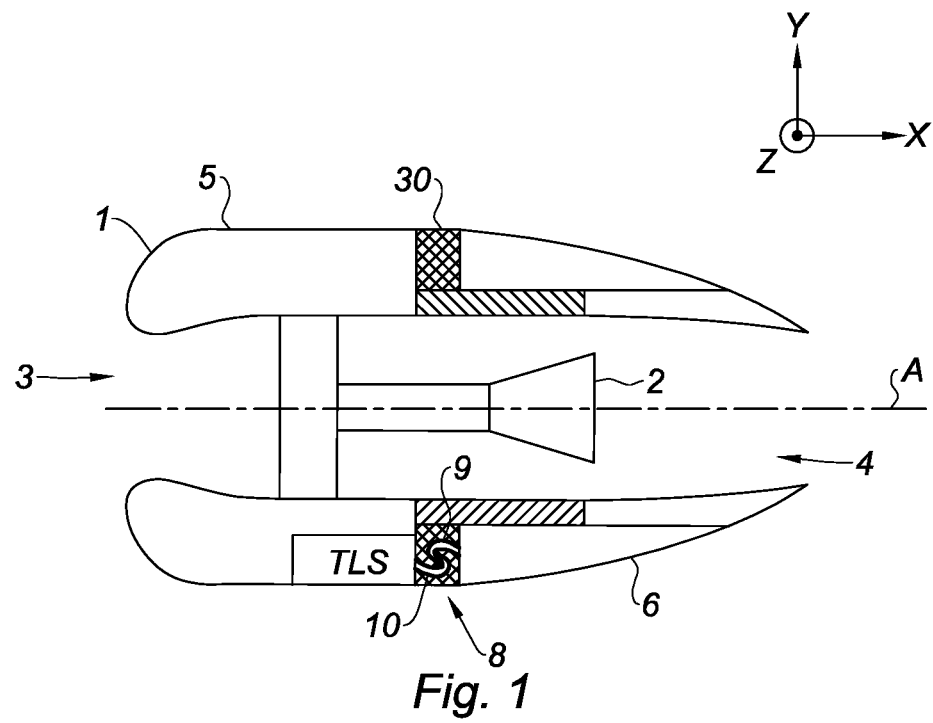
FIG. 1 is a diagram of a nacelle comprising a turbojet engine surrounded by movable cowls in a closed position according to the present disclosure.
Figure 2:
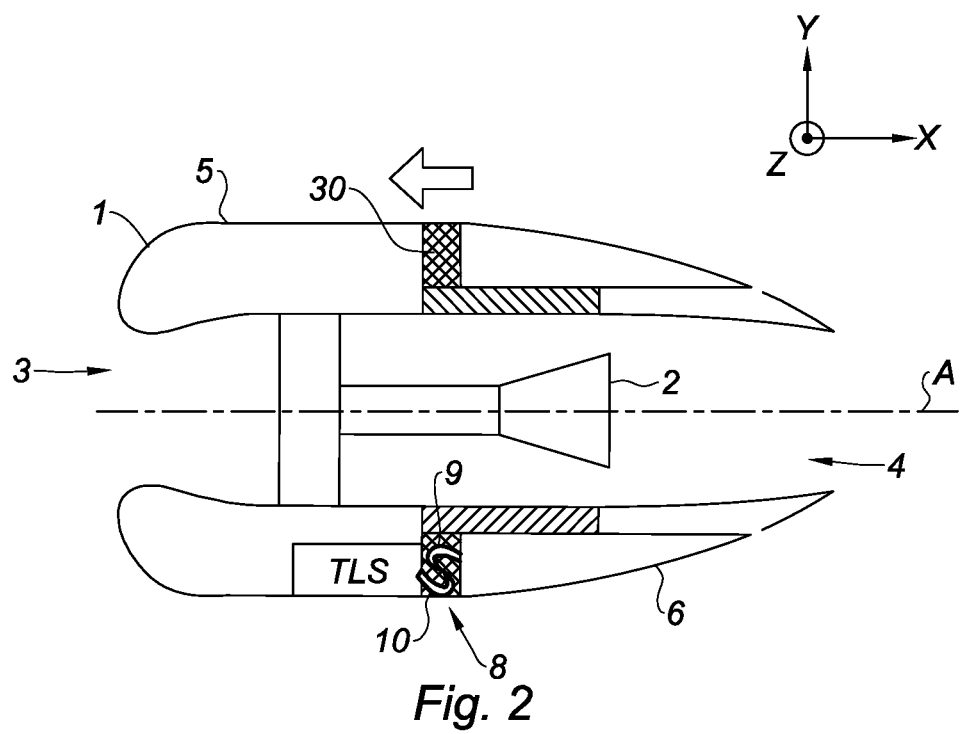
FIG. 2 is a diagram of a nacelle with movable cowls in a reclosed position according to the present disclosure.

FIG. 1 represents a diagram of a nacelle 1 comprising a turbojet engine 2 surrounded by movable cowl 6 according to the present disclosure, in the closed (or stowed) position. In the closed position, the turbojet engine 2 can operate in forward thrust.

The nacelle 1 comprises an air inlet upstream section 3 including a fixed structure 5 surrounding a turbojet engine fan and a downstream section 4 including at least one thrust reverser system. In this example, the fixed structure 5 is a fixed cowl 5. The thrust reverser system comprises a diverting device for diverting at least part of an air flow of the turbojet engine 2.

The downstream section 4 includes at least one cowl 6 movable in translation according to the direction X which is substantially parallel to the longitudinal axis A of the nacelle 1.

A flexible gasket 30 made of elastomer is disposed between the movable cowl 6 and the fixed cowl 5. In the closed position, the gasket 30 provides the sealing between the fixed cowl 5 and the movable cowl 6.

Figure 3:
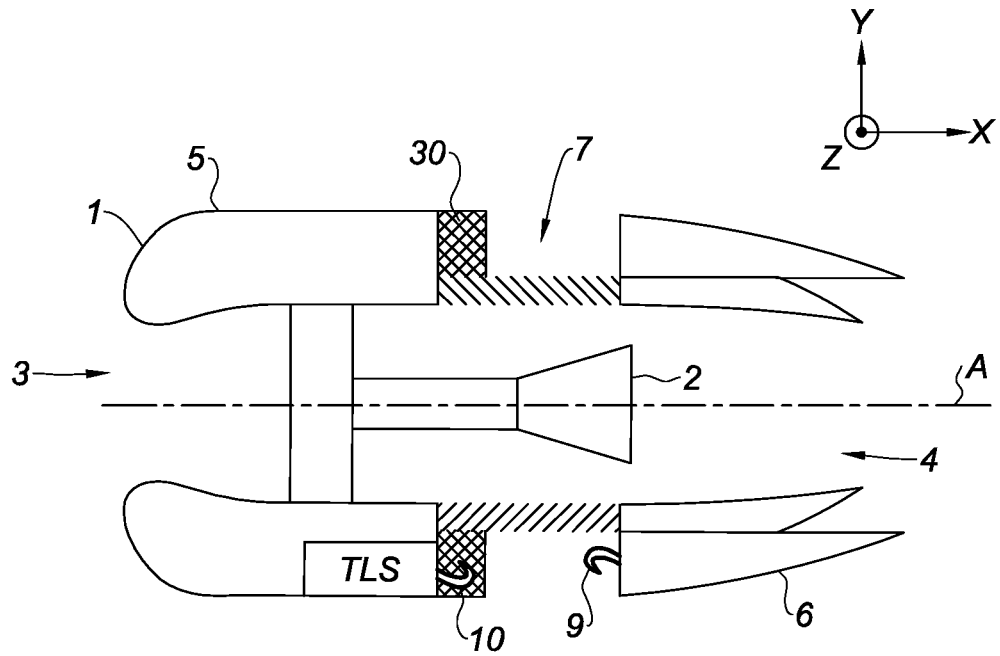
FIG. 3 is a diagram of a nacelle with movable cowls in an open position according to the present disclosure.

The movable cowl 6 is movable between a closed (or stowed) position in which it provides the aerodynamic continuity of the nacelle 1 and covers the diverting device, as illustrated in FIG. 1, and an open (or deployed) position in which it opens a passage 7 in the nacelle 1 and uncovers the diverting device, as illustrated in FIG. 3.

The nacelle 1 comprises at least one system 8 for locking the movable cowl 6 on the fixed cowl 5 including a first locking element 9 and a second locking element 10.

One of the locking elements 10 is mounted on the fixed cowl 5 and the other locking element 9 is mounted on the movable cowl 6.

Each of the locking elements 9, 10 comprises a respective front end 14, 15 each provided with a hooking member 11, 12, including a first hooking member 11 and a second hooking member 12. At least one hooking member 11, 12 may be formed by a hook. In the case where only one of the two hooking members 11, 12 is formed by a hook, the other hooking member may be formed by a bar, for example a cylindrical bar.

In the example of FIGS. 1 to 24, the first locking element 9 is mounted on the movable cowl 6 and the second locking element 10 is mounted on the fixed cowl 5.

In one variant (not represented), the first locking element 9 may be mounted on the fixed cowl 5 and the second locking element 10 may be mounted on the movable cowl 6.

This variant can apply to all the various forms that follow.

The movable cowl 6 is movable between the closed position in which the hooking members 11, 12 of the two locking elements 9, 10 are hooked to each other or engaged (FIG. 1), a reclosed position of the movable cowl 6 in which the two hooking members 11, 12 are automatically unhooked from each other (FIG. 2) and the open position in which the two locking elements 9, 10 are distant from each other (FIG. 3).

The reclosed position of the movable cowl 6 is reached after a translational movement of the movable cowl 6 toward the fixed cowl 5, that is to say to the front (or upstream) of the nacelle 1, causing a displacement of one of the locking elements 9, 10 toward the other locking elements 9, 10 according to the direction X.

This translational movement of the movable cowl 6 toward the fixed cowl 5 from the closed position is commonly called "over-stow" movement which is a reclosure movement of the movable cowl 6 when the latter is already closed. In general, whether the thrust reverser is a cascade-type or door-type, the reclosure movement of a cowl movable in translation or in rotation is carried out before the opening deployment of the movable cowl. This movement corresponds to an additional displacement of the movable cowl, over a relatively short stroke, toward a fixed structure (for example a fixed cowl) from the closed position of the movable cowl.

In the state of the art, the reclosure movement has the function of suppressing the tensile forces which mutually exert between the locking elements in order to enable the unlocking of these elements, and particularly the unlocking of the hooking members that these elements include, by electrically or hydraulically controlled actuators.

In the case of the present disclosure, it is the reclosure movement of the movable cowl 6 that automatically actuates the unlocking of the two locking elements 9, 10.

In the reclosed position, the gasket 30 is compressed by a few millimeters (2 mm for example).

The reclosure movement of the movable cowl 6 is accompanied by a displacement of one of the locking elements 9, 10 relative to the other locking element 9, 10 according to a predetermined relative path. In the first form described with reference to FIGS. 5 to 12, the second locking element 10 comprises path diverting device 16 adapted so that the path followed by the first hooking member 11 relative to the second hooking member 12 takes on a different pathway between a reclosure phase when the movable cowl 6 is displaced from its closed position toward its reclosed position and an opening phase when the movable cowl 6 is displaced from its reclosed position toward its open position.

In other words, the opening path of the first hooking member 11 relative to the second hooking member 12 is performed according to a pathway different from the one performed by the reclosure path of the first hooking member 11, achieving what may be called a hysteresis cycle path, in order to enable the locking elements 9, 10 to remain unlocked subsequently to the automatic unlocking triggered by the reclosure of the movable cowl 6.

The open position is obtained from the reclosed position and after a translational movement of the movable cowl 6 in a direction opposite to the fixed cowl 5 according to the direction X, that is to say rearward or downstream of the nacelle 1.

Figure 4:
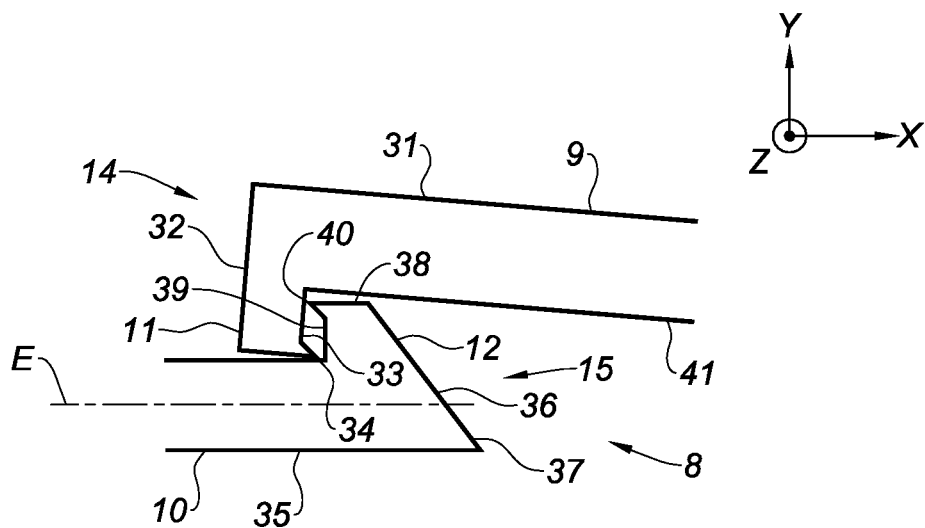
FIG. 4 is a detailed diagram of hooking members in a locked position according to the present disclosure.

As illustrated in the example of FIG. 4, the first hooking member 11 of the first locking element 9 is positioned at its front portion 14. It has a substantially parallelepiped shape.

The first locking element 9 comprises a longitudinal portion 31 prolonged by a front portion 32 forming a right angle with respect to this longitudinal portion 31. In the closed position, the front portion 32 extends in the direction of the second locking element 10.

The first hooking member 11 is formed by this front portion 32 which comprises a projection 34 protruding at the end of an inner wall 33.

The second locking element 10 comprises a longitudinal portion 35 terminated by a beveled portion 36 at the front end 15 of the second locking element 10.

The beveled portion 36 comprises an inclined front wall 37, inclined with respect to the general direction of the longitudinal portion 35 (longitudinal axis E) and toward the latter.

The inclined front wall 37 of the beveled portion 36 is prolonged by an end wall 38 parallel to the general direction of the longitudinal portion 35.

The end wall 38 is prolonged by an inner wall 39 perpendicular to the latter.

The inner wall 39 comprises a projection 40 at its end protruding on the latter, toward the longitudinal portion 35.

When the movable cowl 6 is in the closed position, the two hooking members 11, 12 are locked to each other, as illustrated in FIG. 4.

The front portion 32 of the first locking element 9 is in contact with the beveled portion 36 of the second locking element 10.

The projection 34 of the front portion 32 of the first locking element 9 is blocked by the projection 40 of the beveled portion 36 of the second locking element 10. The movement of the hooking members 11, 12 is inhibited in the direction Y.

These two projections 34, 40 inhibit the unlocking of the locking elements 9, 10.

Figure 6:
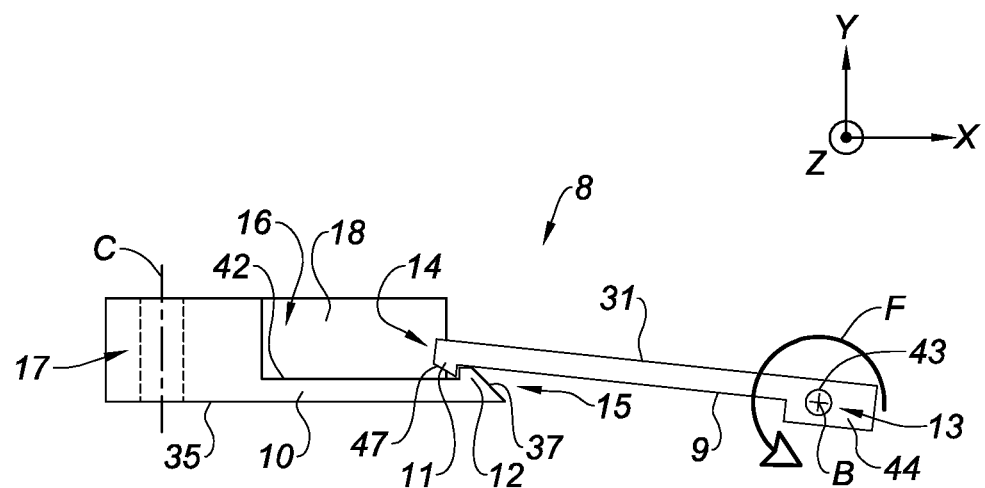
FIG. 6 is a schematic side view of a locking system when a movable cowl is in a closed position according to the present disclosure.

As represented in FIGS. 4 and 6, the longitudinal portion 31 of the first locking element 9 is inclined with respect to the longitudinal portion 35 of the second locking element 10.

During the reclosure movement of the movable cowl 6, the first locking element 9 is displaced toward the second locking element 10, moving the two hooking members 11, 12 away from each other in order to unlock or release the two locking elements 9, 10 from each other. The first locking element 9 overlaps further the second locking element 10.

During this movement, an inner wall 41 of the first locking element 9 slips on the end wall 38 of the beveled portion 36 of the second locking element 10 thanks to the inclination of the first locking element 9 with respect to the second locking element 10.

Figure 11:
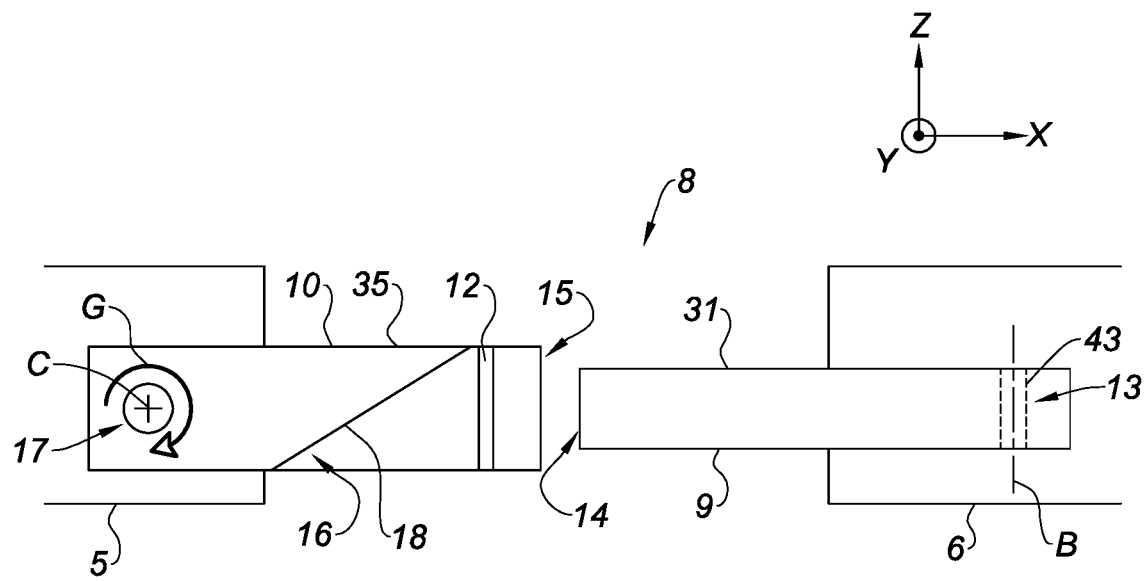
FIG. 11 is a schematic top view of a locking system when a movable cowl is in an open position according to the present disclosure.
Figure 12:
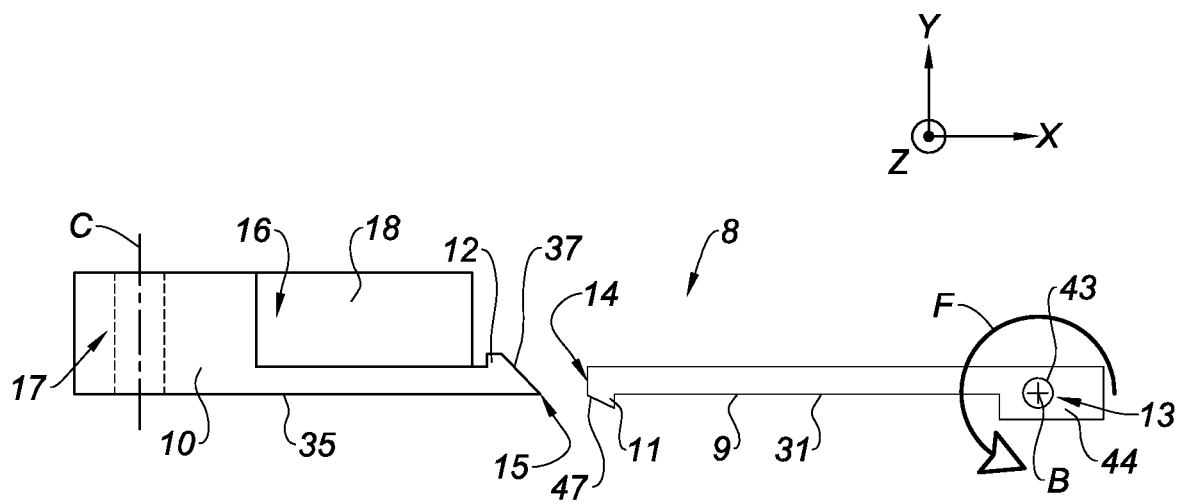
FIG. 12 is a schematic side view of a locking system when a movable cowl is in an open position according to the present disclosure.

When the movable cowl 6 is in the open position, the two locking elements 9, 10 are unlocked and distant from each other, as represented in FIGS. 11 and 12.

When the movable cowl 6 passes from the open position to the closed position, the first locking element 9 gets progressively closer to the second locking element 10.

When the latter come into contact, the first hooking member 11 or more specifically the front portion 32 of the first locking element 9 slips along the second hooking member 12 or more specifically along the inclined front wall 37 of the second locking element 10, then along the end wall 38 of the beveled portion 36 of the second locking element 10, until the inner wall 33 of the first locking element 9 faces the inner wall 39 of the second locking element 10, as illustrated in FIG. 4.

Other shapes of hooking members are also possible while still enabling this operating mode.

FIGS. 5 to 12 illustrate a locking system 8 according to a first form.

In the closed position (FIGS. 5 and 6), the locking elements 9, 10 extend substantially according to the direction X.

The first locking element 9 comprises a first hinge 13 mounted on the movable cowl 6 and having an axis of rotation B perpendicular to the direction X, thus enabling the rotation of the first locking element 9 relative to the movable cowl 6 in a plane of rotation (X, Y) perpendicular to the plane of the figure, between a locking position in which the two hooking members 11, 12 are hooked together and an unlocking position in which the two hooking members 11, 12 are released from each other.

Alternatively, while being perpendicular to the direction X, the axis of rotation B of the first locking element 9 may form an angle relative to the plane of the figure which is a plane substantially tangent to the surface of the movable cowl 6. The plane of rotation of the first hooking member 11 then would no longer be perpendicular to the plane of the figure. It is not excluded to provide the axis of rotation B perpendicular to the plane of the figure, that is to say extending according to a radial direction from the nacelle, although this arrangement might have in the radial direction a larger bulk than that of the first form described herein.

The first locking element 9 comprises a rear end portion 44 including an orifice 43 crossed by the axis B. The rear end portion 44 has a greater thickness than the rest of the first locking element 9.

Figure 5:
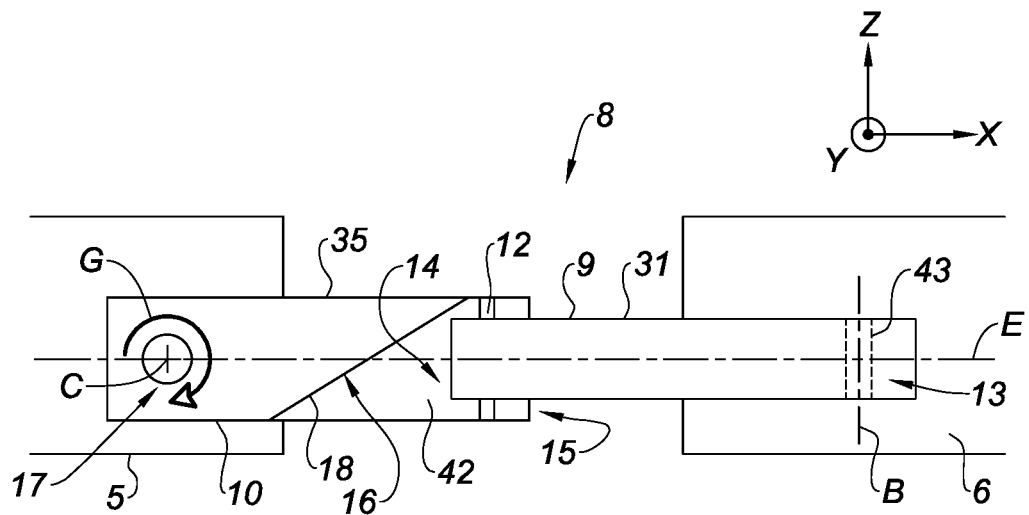
FIG. 5 is a schematic top view of a locking system according to a first form, when a movable cowl is in a closed position according to the present disclosure.

FIG. 5 illustrates a top view and FIG. 6 a side view of the two locking elements 9, 10 in the locked position when the movable cowl 6 is in the closed position.

The front end 14, 15 of the locking elements 9, 10 overlap.

The first locking element 9 comprises a return spring (not represented) capable of exerting a return force to return the first locking element 9 to the second locking element 10.

The arrow F presents the action of the return spring on the first locking element 9.

As detailed hereinabove, the two hooking members 11, 12 are in contact and mutually block each other so as not to be able to be unhooked, even in the presence of strong vibrations.

Figure 7:
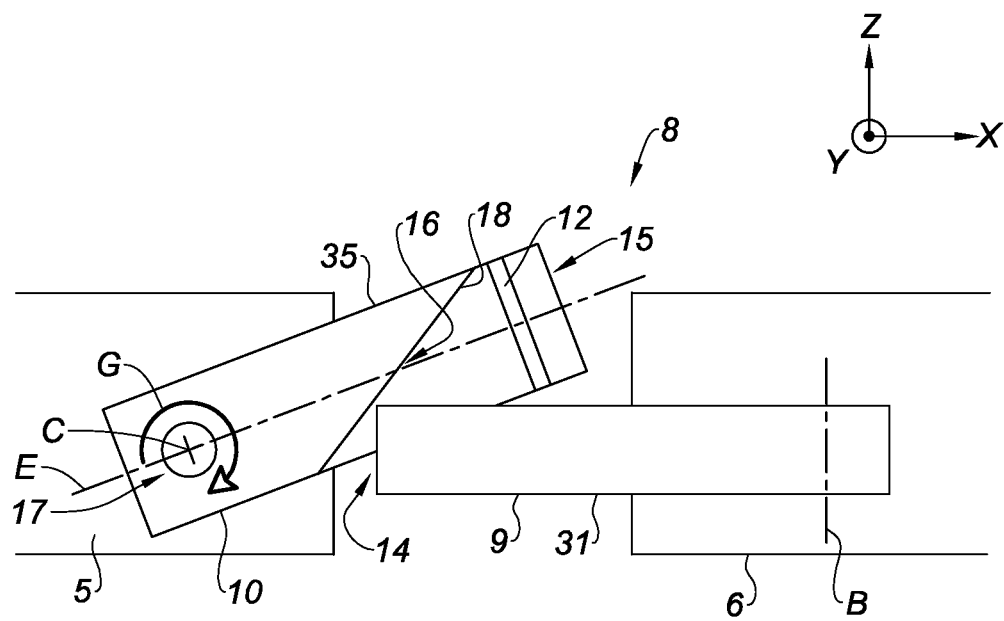
FIG. 7 is a schematic top view of a locking system when a movable cowl is almost in a reclosed position according to the present disclosure.
Figure 8:
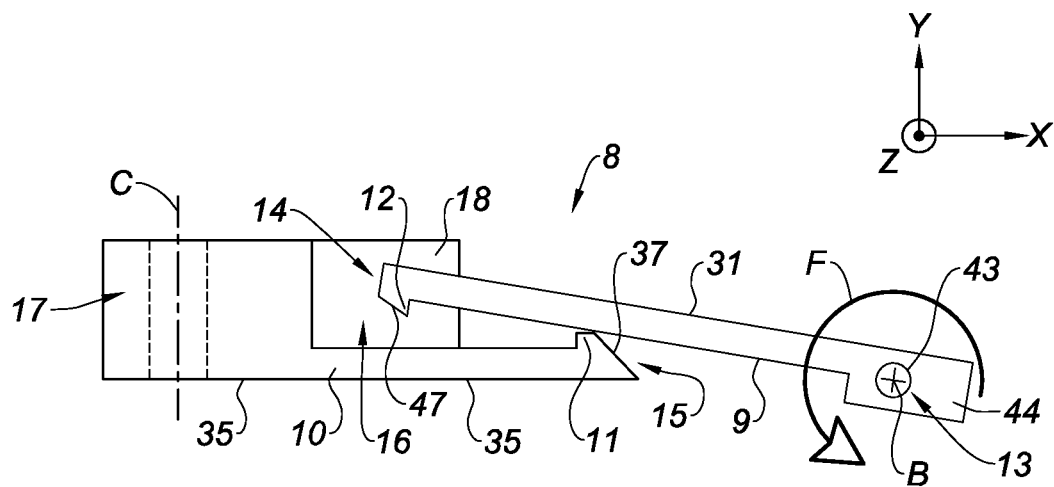
FIG. 8 is a schematic side view of a locking system when a movable cowl is almost in a reclosed position according to the present disclosure.

FIG. 7 illustrates a top view and FIG. 8 a side view of the two locking elements 9, 10 during the reclosure movement of the movable cowl 6.

As represented in FIG. 8, as the movable cowl 6 gets closer to the fixed cowl 5, the first locking element 9 slips along the first hooking member 11 of the second locking element 10, as previously described, causing the pivoting of the first locking element 9 about the axis B which is parallel to the axis Z, in this example, and in the direction opposite to that of the second locking element 10 (clockwise direction in FIG. 8).

The two hooking members 11, 12 move away from each other according to the direction X and the direction Y.

The locking system 8 comprises diverting device 16 allowing to divert the path of the first hooking member 11 of the first locking element 9 from the second hooking member 12 of the second locking element 10 when the movable cowl 6 translates from its closed position toward its reclosed position, as illustrated in FIG. 7.

According to the first form, the path diverting device 16 comprises a wall 18 inclined with respect to a longitudinal axis E of the second locking element 10.

The inclined wall 18 is formed on the second locking element 10. The inclined wall 18 is perpendicular to a planar surface 42 of the second locking element 10.

Figure 9:
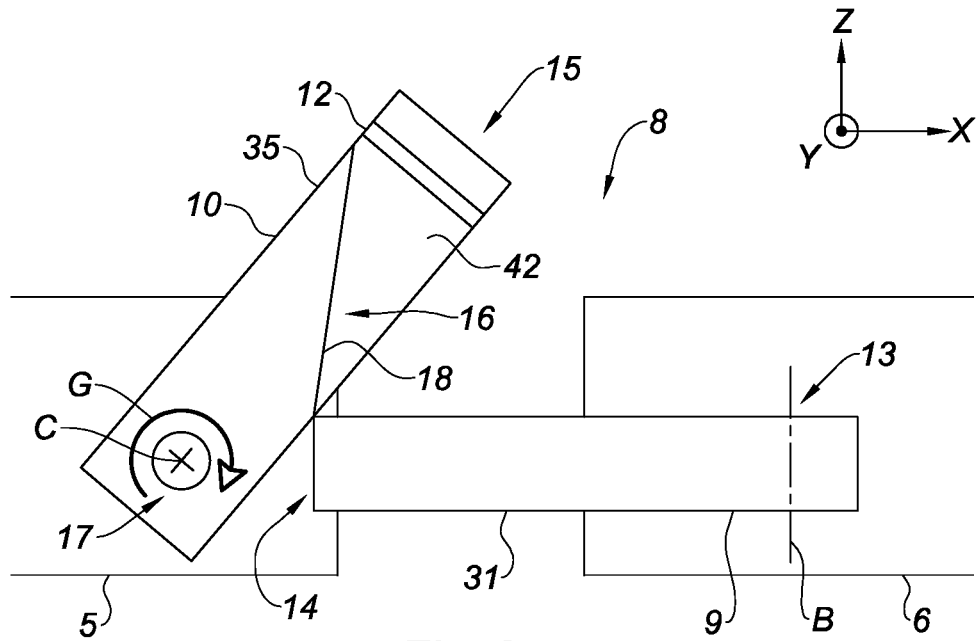
FIG. 9 is a schematic top view of a locking system when a movable cowl is in a reclosed position according to the present disclosure.
Figure 10:
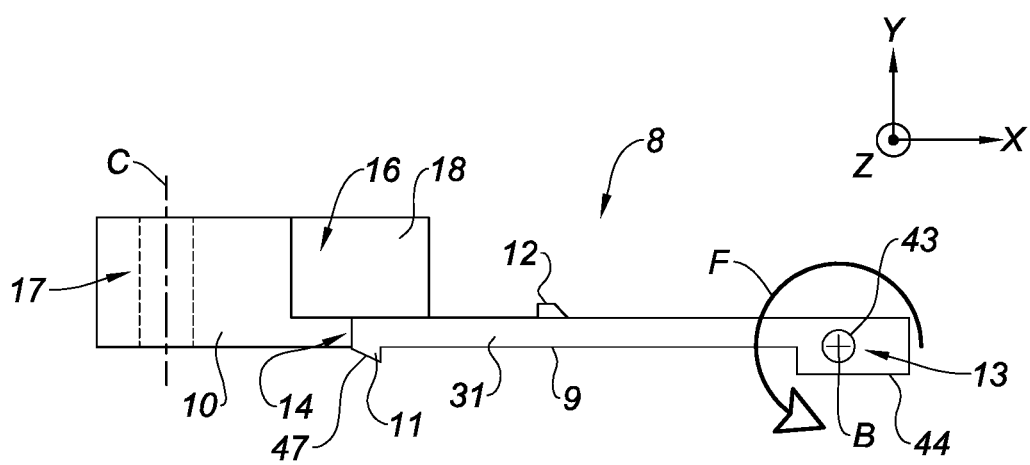
FIG. 10 is a schematic side view of a locking system when a movable cowl is in a reclosed position according to the present disclosure.

A hinge 17 is provided on the second locking element 10. The second hinge 17 has an axis C perpendicular to the axis B enabling the rotation of the second locking element 10 relative to the first locking element 9 in the plane (X, Z) between a locking position in which the two locking elements 9, 10 are substantially aligned according to the direction X (FIGS. 5 and 6) and an unlocking position in which the second locking element 10 is inclined with respect to the first locking element 9 (FIGS. 9 and 10).

The front end 14 of the first locking element 9 is intended to slip along the inclined wall 18 while pushing it in order to make it pivot from the locking position toward the unlocking position.

The portion of the front end 14 that slips along the inclined wall 18 is schematically represented by a wedge, but it should be understood that in order to limit the frictions and the wear of this end portion, the front end 14 may be provided with a rounded portion or a portion provided with a roller or with a ball bearing intended to roll on the inclined wall 18.

The path diverting device 16 comprises a return spring (not represented) tending to hold the second locking element 10 in the locking position, that is to say aligned according to the direction X.

The arrow G represents the action of the return spring on the second locking element 10.

As represented in FIGS. 7 and 8, during the reclosure movement of the movable cowl 6, as the movable cowl 6 gets closer to the fixed cowl 5, the first locking element 9 slips along the first hooking member 11 of the second locking element 10, and simultaneously the front end 14 of the first locking element 9 slips along the inclined wall 18 of the second locking element 10 by pushing it.

This movement causes the rotation of the second locking element 10 relative to the first locking element 9 in the plane (Z, X) (counterclockwise direction in FIG. 7), about the axis C.

The return spring of the path diverting device 16 has a stiffness adapted not to hinder the reclosure movement of the movable cowl 6, that is to say not to inhibit the pivoting of the second locking element 10 during this reclosure movement when the first locking element 9 exerts a pressure on the inclined wall 18 by slipping along the latter.

As represented in FIGS. 9 and 10, when the reclosure movement is completed, the first locking element 9 and the second locking element 10 are shifted relative to each other in the plane (X, Z).

The front ends 14, 15 of the locking elements 9, 10 are no longer superimposed. The first locking element 9 has pivoted about the axis B (counterclockwise direction in FIG. 10) so as to be almost in the same plane (X, Z) as that of the second locking element 10.

Afterwards, the locking elements 9, 10 may be moved away from each other by a translational movement of the movable cowl 6 toward a direction opposite to the fixed cowl 5 (rearward).

FIGS. 11 and 12 represent the distant locking elements 9, 10 when the movable cowl 6 is in the open position.

Thanks to the return spring, the second locking element 10 pivots about the axis C toward the first locking element 9 so as to recover its initial position, that is to say parallel to the direction X.

The locking elements 9, 10 are substantially aligned relative to each other according to the direction X.

Thus, the thrust reverser of the turbojet engine 2 can be activated.

In order to return to the closed position of the movable cowl 6, the latter gets closer to the fixed cowl 5. When the two hooking members 11, 12 come into contact, they automatically engage into each other, as represented in FIGS. 5 and 6.

In one variant (not represented), the first locking element 9 may be mounted on the fixed cowl 5 and the second locking element 10 may be mounted on the movable cowl 6.

Figure 13:
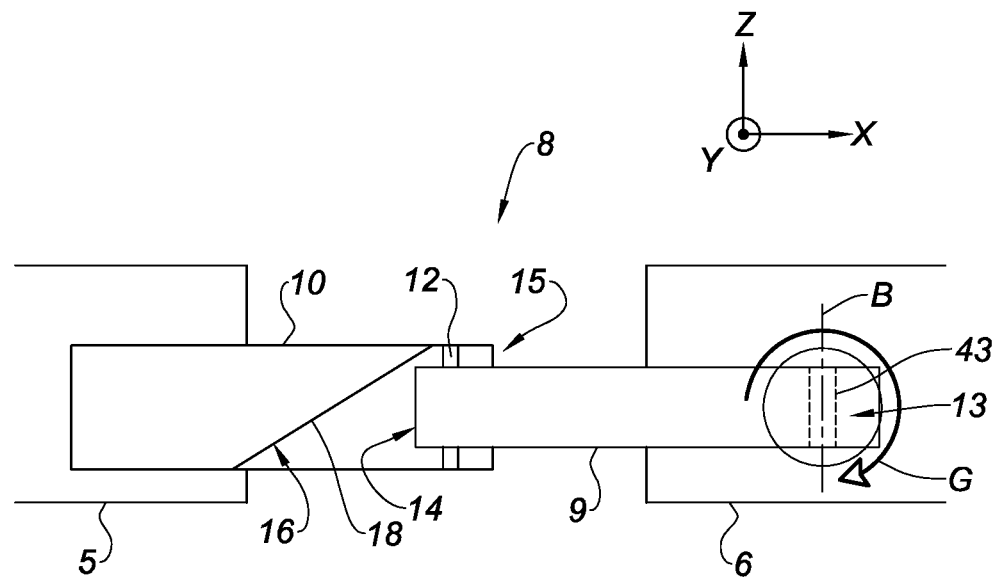
FIG. 13 is a schematic top view of a locking system according to another form when a movable cowl is in a closed position according to the present disclosure.
Figure 14:
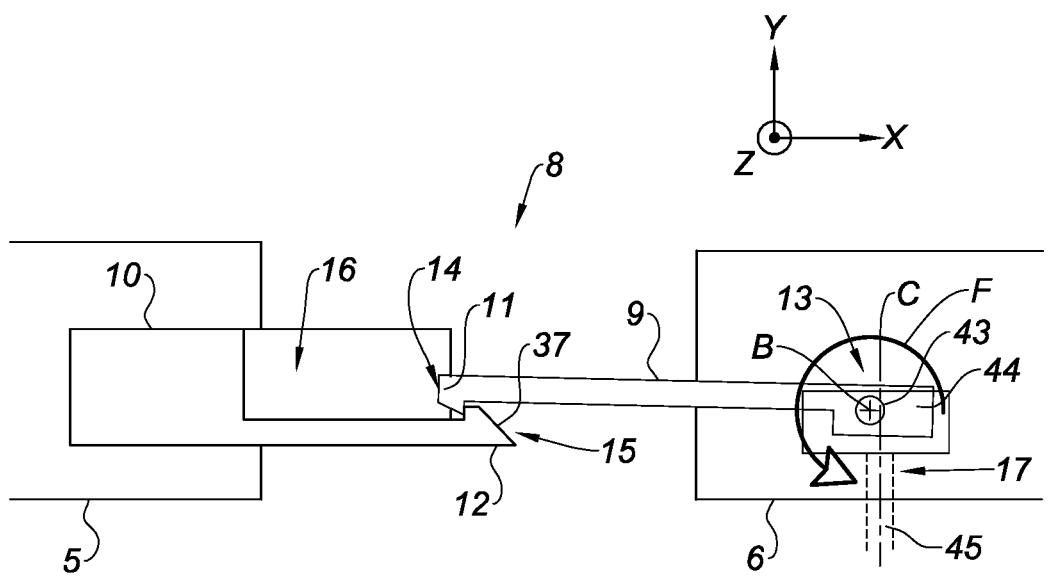
FIG. 14 is a schematic side view of a locking system when a movable cowl is in a closed position according to the present disclosure.

FIG. 13 represents a top view of a locking system 8 according to another form when the movable cowl 6 is in the closed position. FIG. 14 represents a profile view of this locking system 8.

According to this form, the first locking element 9 comprises the first hinge 13 and the second hinge 17.

The first locking element 9 is linked to the movable cowl 6 via the second hinge 17.

The second hinge 17 is associated to a return spring to return the first locking element 9 aligned with the second locking element 10.

The second locking element 10 is fastened to the fixed cowl 5 and is stationary relative to this fixed cowl 5. The axis B is perpendicular to the axis C.

The second locking element 10 comprises an inclined wall 18 as previously described.

The first locking element 9 comprises a rear end portion 44 including an orifice 43 crossed by the axis B.

The rear end portion 44 also includes a second orifice (not represented).

The movable cowl 6 comprises an orifice 45. The axis C of the second hinge 17 crosses the orifice 45 of the movable cowl 6 and the second orifice of the rear end portion 44 of the first locking element 9.

Thus, the first locking element 9 is movable according to two degrees of freedom relative to the second locking element 10 which is fixed.

The operation of this locking system 8 is similar to the one described previously.

The difference lies in the fact that it is the first locking element 9 which pivots about the axis C in the plane (X, Z) (counterclockwise direction in FIG. 13) during the reclosure movement of the movable cowl 6.

The path followed by the first hooking member 11 pivoting relative to the second hooking member 12 is the same as in the previous form.

Similarly, to the previous form, the set formed by the two hooking members 11, 12 has two degrees of freedom relative to the cowls 5, 6.

In these two forms, the first pivoting hooking member 11 performs a reclosure path, from the closed position toward the reclosed position of the movable cowl 6, which is different from the opening path that it follows from the reclosed position to the open position of the movable cowl 6. In other words, the opening path is not performed according to a pathway in the reverse direction to that followed by the reclosure path.

Alternatively, the second locking element 10 may comprise the first hinge 13 and the second hinge 17. The second locking element 10 is then linked to the fixed cowl 5 via the second hinge 17.

Alternatively, for these two variants, the first locking element 9 may be mounted on the fixed cowl 5 and the second locking element 10 may be mounted on the movable cowl 6.

Figure 15:
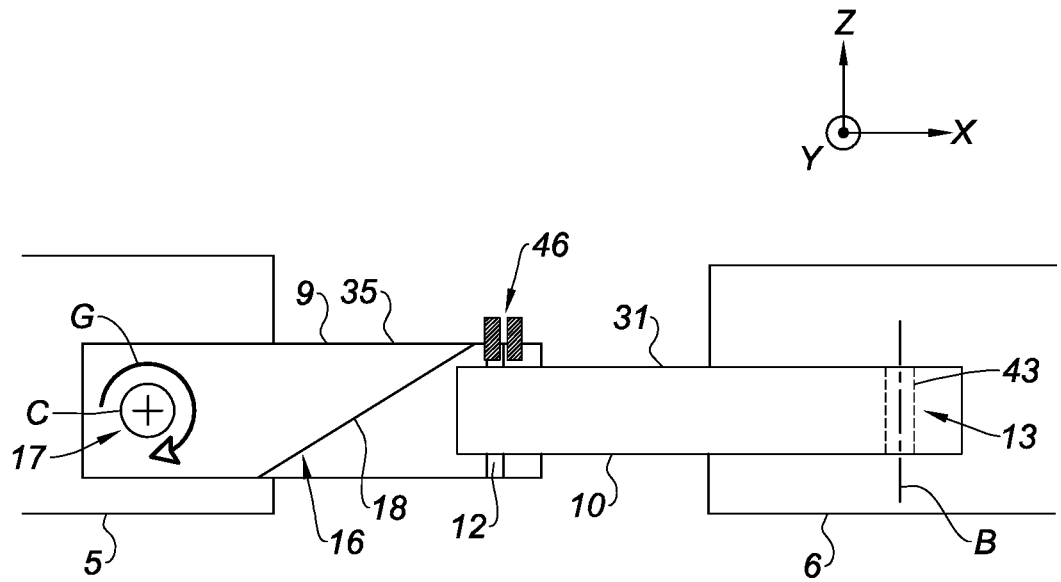
FIG. 15 is a schematic top view of a locking system that includes locking detection sensors when a movable cowl is in a closed position according to the present disclosure.

According to another form represented in FIG. 15, the locking system 8 may comprise a set of sensors 46 formed by two inductive proximity sensors installed in the vicinity of the longitudinal portion 31 of the first locking element 9, for example with a sensor mounted on the first locking element 9 and another sensor mounted on the second locking element 10, so as to detect the locking of the first hooking member 11 of the first locking element 9 (movable cowl 5 in the closed position) by the corresponding position of the two sensors which are then located very close to each other.

The locking system 8 comprises a blocking device (not represented) allowing to block the locking elements 9, 10 in the locked position when the set of sensors 46 has detected the locking of the first hooking member 11 of the first locking element 9.

FIGS. 16 to 25 illustrate another form, in which the path diverting device 16 comprises particularly a pivoting cam.

The second locking element 10 is fastened on the fixed cowl 5. The first locking element 9 is mounted on the movable cowl 6 and comprises the first hinge 13 making it movable in rotation relative to the latter about the axis B.

The movement of the movable cowl 6 from the closed position (FIGS. 17 and 18) to the reclosed position (FIG. 21) causes a translation of the first hooking member 11 from the first locking element 9 toward the second locking element 10.

The front end 14 of the first locking element 9 slips along an inclined wall 20 formed on the second locking element 10. In other words, the first hooking member 11 goes back up the inclined wall 20.

The front portion 32 of the first hooking member 11 of the first locking element 9 comprises an inclined wall 47 which may be provided very slightly concave and substantially parallel to the inclined wall 20 of the second locking element 10 in order to have a non-angular bearing of the first hooking member 11 on the inclined wall 20 and thus limit the mutual wear of these parts during the reclosure movement of the movable cowl 6.

The first locking element 9 is similar to that of the previous form. Similarly, it comprises a first hinge 13 mounted on the movable cowl 6 and having an axis of rotation B perpendicular to the direction X, and also comprises a return spring returning it to the locking position.

Alternatively, while being perpendicular to the direction X, the axis of rotation B of the first locking element 9 may form an angle with respect to the plane of the figure which is a plane substantially tangent to the surface of the movable cowl 6.

Figure 16:
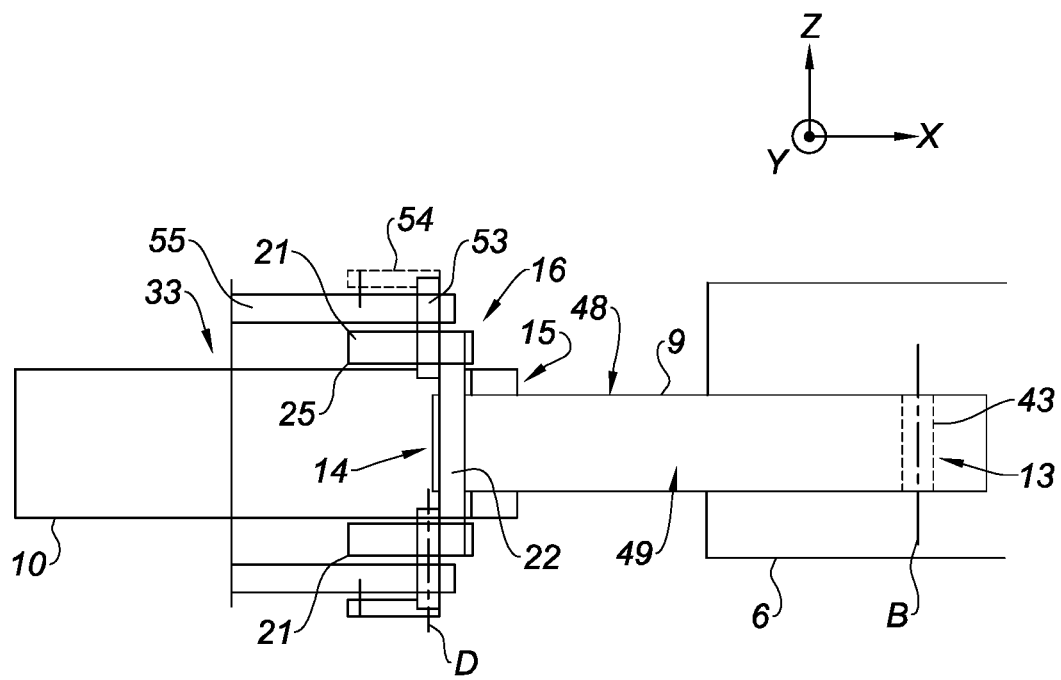
FIG. 16 is a schematic top view of a locking system when a movable cowl is in a closed position according to another form the present disclosure.

The path diverting device 16 comprise at least one cam 21 pivotally mounted on a support 55 secured to a structure, herein the fixed cowl 5, on which the second locking element 10 is securely mounted. For example, the support 55 extends along a lateral face 23 of the second locking element 10, as represented in FIG. 16.

The path diverting device 16 further comprise a guide member 22, for example formed by a cylindrical rod or a pin, provided at the front end 14 of the first locking element 9. The guide member 22 may be provided rotatably mounted on its axis relative to the body of the first locking element 9. For example, a cylindrical rotating rod 22 may be mounted on bearings (not represented) installed on the front end 14. In the following exemplary form, guide rod 22 is designated as the guide member 22. The guide rod 22 protrudes relative to at least one of the lateral sides 48 of the first locking element 9.

The cam 21 is movable in rotation about a pivot axis 53 which extends according to a direction D for example parallel to that of the axis B about which the first locking element 9 pivots. A pivot axis 53 forming with the axis B an angle, for example of 90°, remains a possibility, in which case the position and the profile of the cam should be adapted to enable the first hooking member 11 to perform the aforementioned hysteresis cycle path.

The path diverting device 16 comprises a return spring allowing to hold the cam 21 in the rest position.

The guide rod 22 is positioned on the upper face 49 of the first locking element 9.

FIG. 16 illustrates one form in which the path diverting device 16 comprises two cams 21, and FIGS. 17 to 23 illustrate one form in which the path diverting device 16 comprises one single cam 21.

The presence of two cams 21 implies that the guide rod 22 protrudes from the two lateral sides 48 of the first locking element 9. This redundancy provides additional safety in the very hypothetical case of breakage of one of the two cams. Nonetheless, safety may be considered satisfactory with one single cam 21.

With one single cam 21 or two cams, the mechanism for providing the stop rest position of each cam 21 may comprise an arm 54 secured to the pivot axis 53 of the cam, which abuts against a pin fastened to the movable cowl 5. In FIGS. 16 and 17, such a pin is mounted on each support 55 secured to the fixed cowl 5, and is schematized by a line.

For simplicity, the kinematics of the device will be described with one single cam (FIGS. 17 to 23).

The cam 21 comprises a first portion 50 and a second portion 51 inclined with respect to the first portion 50. These two portions 50, 51 are formed on either side of the pivot axis 53.

The first portion 50 is longer than the second portion 51. The presence of a second portion 51 of the cam 21 is not essential, its usefulness mainly concerns a form referring to FIGS. 24 and 25.

The pivot axis 53 of the cam 21 may be positioned above the inclined wall 20, between the latter and the second hooking member 12 of the second locking element 10 (not represented).

Figure 18:
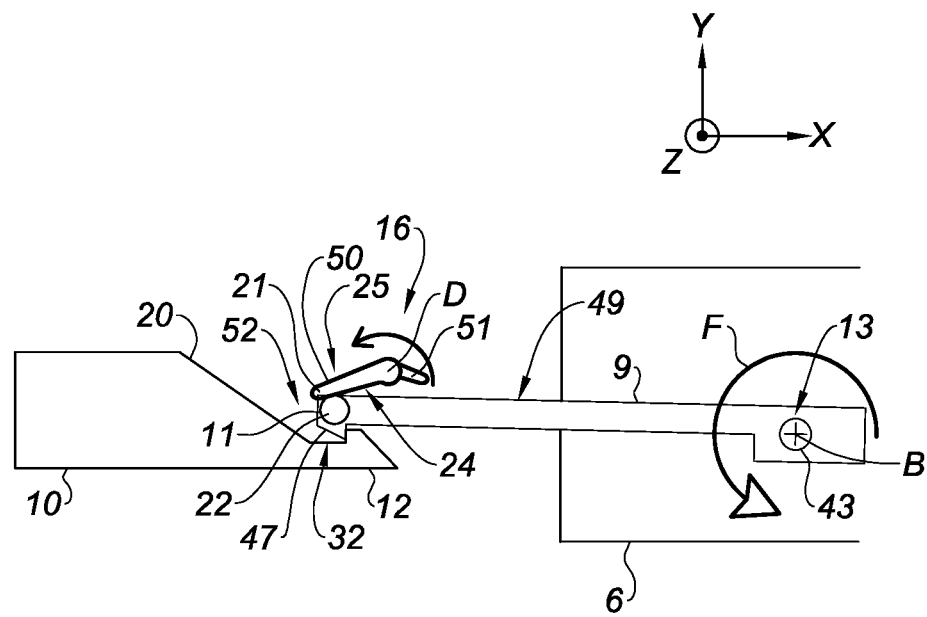
FIG. 18 is a schematic side view of the locking system of FIG. 17 when the movable cowl is in the closed position.

In one form, the pivot axis 53 of the cam 21 is positioned above the second hooking member 12 of the second locking element 10, as represented in FIGS. 17 to 23, and such that the front end of the first portion 50 of the cam 21 slightly projects forwardly from the guide rod 22 when the locking elements 9, 10 are locked to each other (FIG. 18). This arrangement enables the cam 21 to rapidly pivot toward its stop rest position for the automatic unlocking of the locking elements 9, 10 during the reclosure of the movable cowl (FIG. 21), despite the very short (a few millimeters) stroke d of the reclosure displacement.

The cam 21 is positioned in the proximity of the guide rod 22 so that the internal face 24 of the cam 21 is in contact with the guide rod 22 of the first locking element 9 when the movable cowl 6 is in the closed position. More specifically, it is the internal face 24 of the first portion 50 of the cam 21 which is in contact with the guide rod 22.

When the movable cowl 6 is in the closed position (FIGS. 17 and 18), the two locking elements 9, 10 are locked to each other by cooperation of their respective hooking members 11, 12. The first locking element 9 is at rest and substantially aligned along the direction X.

The cam 21 is in the bearing position against the first locking element 9, under the effect of the return spring of the cam. More specifically, the internal face 24 of the cam 21 bears on the guide rod 22 of the first locking element 9.

In the closed position of the movable cowl 6, the first hooking member 11 of the first locking element 9 is engaged into a cavity 52 formed in the second locking element 10 and positioned between the second hooking member 12 and the inclined wall 20 of the second locking element 10.

When the movable cowl 6 starts its reclosure movement toward the fixed cowl 5 (FIGS. 19, 20), the first locking element 9 translates toward the second locking element 10 (forward).

The inclined wall 47 of the first locking element 9 starts slipping along the inclined wall 20 of the second locking element 10, that is to say the first hooking member 11 of the first locking element 9 goes back up the inclined wall 20 of the second locking element 10.

Depending on the profile of the inclined wall 20, this displacement causes a more or less substantial rotational movement of the first locking element 9 about the axis B according to a direction opposite to the second locking element 10 (clockwise direction of FIG. 20).

Simultaneously, the guide member 22 of the first locking element 9 slips or rolls along the internal face 24 of the first portion 50 of the cam 21. This displacement may make the cam 21 slightly pivot according to a direction opposite to the second locking element 10 (clockwise direction of FIG. 20), depending on the profile of the cam and on the profile of the inclined wall 20 of the second locking element 10 which determines the path of the first hooking member 11.

In the reclosed position of the movable cowl 6 (FIG. 21), the first locking element 9 has completely translated toward the second locking element 10.

The first hooking member 11 of the first locking element 9 lies in an advanced position on the inclined wall 20 of the second locking element 10.

The guide member 22 of the first locking element 9 is disengaged from the internal face 24 of the first portion 50 of the cam 21, which has enabled the cam to pivot toward the second locking element 10 (counterclockwise direction of FIG. 21) so as to recover its stop rest position, the first portion 50 of the cam then being inclined downward.

The guide member 22 then lies in front of the external wall 25 of the cam 21.

When the movable cowl 6 performs an opening movement (FIGS. 22, 23), it moves away from the fixed cowl 5, causing a translation of the first locking element 9 in a direction opposite to the second locking element 10 along the direction X (rearward).

The inclined wall 47 of the first locking element 9 slips along the inclined wall 20 of the second locking element 10 toward the second hooking member 12 of the second locking element 10 until the guide member 22 comes into contact with the external face 25 of the first portion 50 of the cam 21.

The cam 21 being in its stop rest position, the guide member 22 then slips on the external face 25 of the first portion 50 of the cam 21 without the cam pivoting. Indeed, the guide member 22 of the first locking element 9 exerts a pressure which tends to make the cam 21 pivot in the counterclockwise direction of FIG. 22, while the cam is in its stop rest position in this direction. The external face 25 of the first portion 50 serves therefore as a guide surface of the guide member 22 during the opening of the movable cowl from its reclosed position.

Consequently, the hooking member of the first locking element 9 is guided by the cam 21 so as to perform an opening path which is different from the path performed during the reclosure of the movable cowl 6.

The stroke d of the first hooking member 11 of the first locking element 9 (or travel during the reclosure of the movable cowl 6) and the stiffness of the gasket 30 are adapted so as not to risk an inadvertent unlocking of the hooking members 11, 12 in the case of a fortuitous event such as strong vibrations or impacts (foreign objects, loss of a fan blade, burst of a turbine disk, etc.) that the turbojet engine 2 would undergo.

Indeed, the crushing of the gasket 30 over the stroke d during the reclosure of the movable cowl 6 enables an automatic unlocking of the hooking members 11, 12. Hence, the reclosure of the movable cowl is controlled only, that is to say cannot result from a fortuitous event, in order not to risk an inadvertent activation of the thrust reverser system which would have catastrophic consequences.

The stroked may be larger than 3 mm, and even larger than 5 mm. The gasket 30 keeps a reduced stiffness.

According to another form represented in FIGS. 24 and 25, the locking system 8 comprises a safety device intended to alleviate the consequences of a hypothetical inadvertent reclosure of the movable cowl.

The safety device comprises a cylinder 26, positioned in the proximity of the cam 21 and which comprises a movable rod 27 capable of occupying a deployed position in which the rod 27 is extended from the cylinder 26 so as to face very closely an upper face 28 of the second portion 51 of the cam 21 (FIGS. 24 and 25).

This deployed position, called safety position, is activated subsequently to the locking of the hooking members 11, 12, and its deactivation is driven by the control of the opening of the movable cowl 6. In this safety position, the rod 27 is capable of serving as a stop to inhibit a significant rotation of the cam 21 in case of reclosure of the movable cowl. The rod 27 may further occupy a retracted position (not represented) in which it is retracted into the cylinder 26 and cannot serve as a stop to the cam 21.

In case of uncontrolled reclosure of the movable cowl 6, no order for retracting the rod 27 is sent to the cylinder 26. The rod 27 remaining in its deployed position, it constitutes a safety stop for the cam 21, inhibiting the latter from significantly pivoting toward its rest position when the guide member 22 of the first locking element 9 is displaced in the reclosure direction until losing contact with the internal face 24 of the cam 21. In other words, the passage from the position of the cam 21 in FIG. 20 to that of the cam in FIG. 21 is made impossible thanks to the holding of the cam 21 by the rod 27.

In the represented example, during the reclosure movement of the movable cowl 6, the displacement (in the forward direction) of the guide member 22 of the first locking element 9 first makes the cam 21 slightly pivot in the clockwise direction in FIG. 25. Then, the cam 21 slightly pivots in the other direction (counterclockwise direction) toward the second locking element 10 as the guide member 22 passes beneath the end of the cam 21, to abut against the rod 27 of the cylinder 26, that is to say to return almost in its initial position.

After the reclosure movement of the movable cowl 6, when the guide member 22 of the first locking element 9 returns along the direction X, it is forced to follow the reverse path to the forward direction, that is to say to pass again under the cam 21. This returns the hooking members 11, 12 to their locking position by making the cam 21 slightly pivot in the clockwise direction, which enables a stress relief on the rod 27 of the cylinder 26.

An undesired opening of the movable cowl 6 is thus inhibited. Thus, the risk of inadvertent unlocking of the hooking members 11, 12 is zero or almost zero thanks to this additional safety.

Advantageously, the safety mechanism does not exert any force on the cam 21 or on other parts, apart from the barely probable extreme case of uncontrolled reclosure of the movable cowl 6. In other words, there is no contact between the rod 27 of the cylinder 26 and the cam 21 in normal operation, as illustrated in FIG. 25. Because of this absence of contact, the displacement of the rod 27 subsequently to the locking of the hooking members 11, 12 is performed without any external stress on the cylinder 26.

Therefore, this safety mechanism may be simple, involving little maintenance and having a long durability.

In normal operation, the control of the opening of the movable cowl 6 first causes a controlled reclosure of the cowl 6. The rod 27 of the cylinder 26 is therefore be retracted before the movable cowl 6 is displaced from its reclosed position toward its open position, in order not to inhibit the unlocking of the hooking members 11, 12. For this purpose, the order for controlling the opening of the cowl 6 may also serve to control the retraction of the rod 27.

Moreover, the locking system 8 may comprise a blocking device allowing to block the locking elements 9, 10 in the locked position when a locking detection system (for example a set of sensors 46 as previously described) has detected the locking of the first hooking member 11 of the first locking element 9.

The extension (deployed position) of the rod 27 of the cylinder 26 may then be controlled by the control system of the blocking device, as soon as the locking detection system detects the passage from an unlocked state to the locked state.

In one form, the rod 27 of the cylinder 26 comprises a position sensor for informing the control system of the blocking device and checking the proper matching between the position of the rod 27 of the cylinder 26 and the state of the blocking device.

The energy for displacing the rod 27 of the cylinder 26 may be very little, since the latter has no force to exert on any part.

For example, the cylinder 26 may be a small-sized electric cylinder.

In the case where the path diverting device 16 comprise two cams 21 as described with reference to FIG. 16, it is possible to provide for a bridging rigidly linking the two pivot axes 53 of the cams in order to make the two cams secured, in movement, to each other. The geometry of this bridging, for example U-shaped bridging, will be provided so as not to hinder the passage of the first hooking member 11 between the two cams. This arrangement allows having only one safety device such as a cylinder 26 to inhibit the rotation of the two cams 21 in case of uncontrolled reclosure of the movable cowl 6.

Moreover, in the example represented with reference to FIGS. 24 and 25, the holding of the cam 21 by the rod 27 of the cylinder 26 is performed at the level of the second portion 51 of the cam. Alternatively, the second portion 51 of the cam may be suppressed, and the cylinder 26 may be positioned so that in case of uncontrolled reclosure of the movable cowl 6, the rod 27 of the cylinder could act as a stop on the arm 54 secured to the pivot axis 53 of the cam to inhibit a significant rotation of the cam.

Furthermore, similarly to the previously-described forms, the pivoting first locking element 9 is not necessarily mounted on the movable cowl 6. According to a non-represented variant, the first locking element 9 may be pivotally mounted on the fixed cowl 5 or on another fixed structure of the nacelle, the second locking element 10 as well as the path diverting device 16 then being provided secured, in displacement, to the movable cowl 6.

In the previously described forms of the present disclosure, the different forms of the locking system 8 are used to lock a cowl 6 movable in translation on the nacelle 1 relative to a fixed structure 5 constituted by a fixed cowl of the nacelle, the thrust reverser system then being of the cascade-type.

A thrust reverser system according to the present disclosure is however not limited to this type of thrust reverser, the present disclosure also applies to door-type thrust reversers. In this type of thrust reverser system, a movable cowl does not perform a translation but a rotation relative to an axis of rotation so that the cowl itself constitutes a deflector for diverting both the secondary flow and the primary flow generally forward outside of the nacelle.

The present disclosure therefore applies also to a door-type thrust reverser system, comprising two movable cowls 6 capable of pivoting respectively about two distinct axes of rotation, as illustrated in FIG. 26. The "movable cowls" 6 are also called "movable doors". There may be only two doors as in the represented example, but architectures with more than two doors, for example with four doors, also exist and may be employed while still remaining within the scope of the present disclosure.

In the represented example, the two movable cowls 6 are positioned in opposition with respect to a longitudinal axis A of the thrust reverser system.

The thrust reverser system comprises two locking systems 8 positioned on the nacelle 1 and in opposition with respect to the longitudinal axis A.

Each locking system 8 comprises two first locking elements 9 mounted on two different movable cowls or doors 6 and two second locking elements mounted back to back on a fixed structure 5 of the nacelle 1.

The two second locking elements 10 may be made in the form of distinct parts, or may constitute two portions of a common part 100 provided to cooperate with the two first locking elements 9 mounted on two different movable cowls 6, as represented in FIGS. 26 and 27.

Each of the two first locking elements 9 is positioned at a front wedge 56 of the concerned movable cowl 6.

Each common part 100 comprising two second locking elements 10 is positioned on a circumferential wall 57 of the fixed structure 5 of the nacelle 1. In the represented form, one single common part 100 is shown, but it should be understood that two common parts 100 are diametrically opposed on the circumferential wall 57 with respect to the longitudinal axis A.

The first and second locking elements 9, 10 of each locking system 8 associated to a movable cowl 6 can be locked and unlocked relative to each other in order to lock the movable cowl 6 on the fixed structure 5 in the closed position of the movable cowl.

A controlled displacement of each movable cowl 6 from its closed position to a reclosed position triggers the unlocking of the first and second locking elements 9, 10 of each locking system 8 associated to the movable cowl 6.

The reclosure of a movable cowl 6 causes a displacement of the two first locking elements 9 of the same movable cowl 6 in the direction of the longitudinal axis A, during a rotational movement of the movable cowl 6 directed toward this axis.

According to one form, a locking system 8 is structurally and functionally similar to any one of the locking systems 8 illustrated in FIGS. 16 to 25.

FIGS. 27 and 28 describe more specifically an example of a locking system 8 structurally and functionally similar to that described with reference to FIG. 16.

Each first locking element 9 comprises a first hinge 13 having an axis of rotation B enabling a rotation of the first locking element 9 between a locking position and an unlocking position relative to the second locking element 10, during the displacement of the movable cowl 6 between a closed position and a reclosed position of the latter.

The first locking element 9 comprises a return spring capable of exerting a return force to return the first locking element 9 to the second locking element 10.

Each of the first locking elements 9 comprises a first hooking member 11, as illustrated in FIG. 28, which may include a hook.

The common part 100 comprising two second locking elements 10 comprises two second hooking members 12 which may include hooks, opposite to each other and each cooperating with a distinct first hooking member 11.

Each second locking element 10 comprises a path diverting device 16 adapted so that the path followed by each first hooking member 11 relative to the associated second hooking member 12 takes on a different pathway between a reclosure phase when the two movable cowls 6 are displaced from their closed position toward their respective reclosed position and an opening phase when the movable cowls 6 are displaced from their reclosed position toward their open position.

The two path diverting devices 16 provided on the common part 100 of a locking system 8 are opposite to each other.

Each of the two path diverting devices 16 comprises an inclined wall 20 formed on the corresponding second locking element 10. The two inclined walls 20 have an opposite orientation.

The front end 14 of a first locking element 9 is intended to slip along the corresponding inclined wall 20, during the reclosure movement causing a translation of the first hooking member 11 of the first locking element 9.

In the represented form, each of the path diverting devices 16 comprises two cams 21 as previously described. Of course, alternatively, one single cam 21 may be provided, in the same manner as in the form with reference to FIG. 17.

The presence of two cams 21 implies that the guide rod 22 protrudes from the two lateral sides 48 of the first locking element 9.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser system for a turbojet engine, including at least one movable cowl mounted on a nacelle of the turbojet engine and displaceable between a closed position in which the thrust reverser system is inactivated and an open position in which the thrust reverser system is activated, the thrust reverser system comprising:
    at least one locking system comprising a first locking element mounted on the at least one movable cowl and a second locking element mounted on a fixed structure of the nacelle, the first and the second locking elements capable of moving between a locked position and an unlocked position relative to each other to lock the at least one movable cowl on the fixed structure when the at least one movable cowl is in the closed position,
    wherein the at least one locking system is shaped such that a controlled displacement of the at least one movable cowl in translation from the closed position to a reclosed position triggers unlocking of the first and the second locking elements,
    wherein the first locking element comprises a first hooking member and the second locking element comprises a second hooking member, the first and the second hooking members adapted to be hooked to each other when the first and the second locking elements are in the locked position such that the first and the second locking elements are inhibited from being spaced apart according to an opening direction of the at least one movable cowl,
    wherein the at least one locking system further comprises a path diverting device adapted to cause the first hooking member to follow a different pathway relative to the second hooking member between a reclosure phase when the at least one movable cowl is displaced from the closed position toward the reclosed position and an opening phase when the at least one movable cowl is displaced from the reclosed position toward the open position.

2. The thrust reverser system according to claim 1, wherein the first locking element further comprises a first hinge having an axis of rotation (B) and when the at least one movable cowl is in the closed position, the axis of rotation (B) is perpendicular to a direction (X) of displacement of the at least one movable cowl between the closed position and the reclosed position such that said first locking element rotates between the locked position and the unlocked position relative to the second locking element.

3. The thrust reverser system according to claim 2, wherein the first locking element further comprises a return spring configured to exert a return force to return the first locking element to the second locking element.

4. The thrust reverser system according to claim 1, wherein the path diverting device comprises: an inclined wall formed on the second locking element that inclines with respect to a longitudinal axis (E); and
    a second hinge disposed on the second locking element, the second hinge having an axis (C) perpendicular to an axis of rotation (B) of the first locking element to enable rotation of the second locking element relative to the first locking element between the locked position in which the first and the second locking elements are substantially aligned according to a direction (X) and the unlocked position in which the second locking element is inclined relative to the first locking element,
    wherein a front end of the first locking element is configured to slip along the inclined wall and push the second locking element such that the second locking element pivots from the locked position toward the unlocked position.

5. The thrust reverser system according to claim 1, wherein the path diverting device comprises an inclined wall formed on the second locking element, the second locking element fastened on the fixed structure and the first locking element mounted on the at least one movable cowl.

6. The thrust reverser system according to claim 5, wherein the first locking element comprises a first hinge operable to rotate the first locking element relative to the second locking element about an axis (B) when the at least one movable cowl is displaced from the closed position to the reclosed position,
    wherein a front end of the first locking element is configured to slip along the inclined wall of the path diverting device causing a translation of the first hooking member of the first locking element.

7. The thrust reverser system according to claim 5, wherein the path diverting device further comprises:
    at least one cam pivotally mounted on a support secured to the fixed structure or to the at least one movable cowl; and
    a guide member disposed at a front end of the first locking element, said guide member adapted to displace during said reclosure phase of the at least one movable cowl to enable the at least one cam to pivot toward a rest position, wherein during said opening phase of the at least one movable cowl, the guide member cooperates with the at least one cam held in the rest position and guides the first hooking member according to said different pathway.

8. The thrust reverser system according to claim 7, wherein the path diverting device further comprises a return spring configured to bias the at least one cam in rotation toward the rest position.

9. The thrust reverser system according to claim 7, wherein the at least one cam has an internal face facing the second hooking member and an external face directed opposite the second hooking member, wherein the guide member bears against said internal face during the reclosure phase of the at least one movable cowl and bears against said external face during the opening phase of the at least one movable cowl.

10. The thrust reverser system according to claim 9, wherein an axis (D) of the at least one cam is positioned above the second hooking member of the second locking element such that the internal face of the at least one cam is in contact with the guide member of the first locking element when the at least one movable cowl is in the closed position.

11. The thrust reverser system according to claim 7, wherein the at least one locking system comprises a safety device operable to stop rotation of the at least one cam during uncontrolled reclosure of the at least one movable cowl.

12. The thrust reverser system according to claim 11, wherein the safety device comprises a cylinder proximate the at least one cam, said cylinder comprising a rod movable between a deployed position in which the rod is extended from the cylinder to block the at least one cam during reclosure of the at least one movable cowl and a retracted position in which the rod is retracted into the cylinder to release a second portion of the at least one cam.

13. A method for unlocking a thrust reverser system for a turbojet engine including at least one movable cowl mounted on a nacelle of the turbojet engine and displaceable between a closed position in which the thrust reverser system is inactivated and an open position in which the thrust reverser system is activated, the method comprising:
   providing the thrust reverser system according to claim 1;
   and controlling displacement of the at least one movable cowl in translation from the closed position to the reclosed position such that unlocking of the first and the second locking elements is triggered,
   wherein the first hooking member follows the different pathway relative to the second hooking member between the reclosure phase when the at least one movable cowl is displaced from the closed position toward the reclosed position and the opening phase when the at least one movable cowl is displaced from the reclosed position toward the open position.

14. The method for unlocking a thrust reverser system according to claim 13, wherein the path diverting device further comprises at least one cam and a safety device is operable to stop rotation of the at least one cam during uncontrolled reclosure of the at least one movable cowl.

* * * * *